(12) United States Patent  
Raby

(10) Patent No.: US 11,351,012 B2  
(45) Date of Patent: Jun. 7, 2022

(54) ORTHODONTIC BRACKET FOOTING

(71) Applicant: 3M INNOVATIVE PROPERTIES COMPANY, Saint Paul, MN (US)

(72) Inventor: Richard E. Raby, Lino Lakes, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 108 days.

(21) Appl. No.: 16/469,564

(22) PCT Filed: Dec. 13, 2017

(86) PCT No.: PCT/US2017/066167  
§ 371 (c)(1),  
(2) Date: Jun. 13, 2019

(87) PCT Pub. No.: WO2018/112073  
PCT Pub. Date: Jun. 21, 2018

(65) Prior Publication Data  
US 2019/0321137 A1  Oct. 24, 2019

Related U.S. Application Data

(60) Provisional application No. 62/435,281, filed on Dec. 16, 2016.

(51) Int. Cl.  
*A61C 7/14* (2006.01)  
*A61C 7/28* (2006.01)  
*A61C 7/00* (2006.01)

(52) U.S. Cl.  
CPC ............... *A61C 7/145* (2013.01); *A61C 7/28* (2013.01); *A61C 7/002* (2013.01); *A61C 7/146* (2013.01)

(58) Field of Classification Search  
CPC .. A61C 7/08; A61C 7/14; A61C 7/145; A61C 7/146; A61C 7/28; A61C 7/12; A61C 7/148; A61C 7/20  
(Continued)

(56) References Cited

U.S. PATENT DOCUMENTS 4,536,150 A   8/1985  Smith  
4,597,739 A   7/1986  Rosenberg  
(Continued)

FOREIGN PATENT DOCUMENTS

EP       2008636      12/2008  
WO   WO 2007-084727    7/2007  
(Continued)

OTHER PUBLICATIONS

Kaneko, Kazuyuki & Yokoyama, Ken'ichi & Moriyama, Keiji & Asaoka, Kenzo & Sakai, Jun'ichi. (2004). Degradation in performance of orthodontic wires caused by hydrogen absorption during short-term immersion in 2.0% acidulated phosphate fluoride solution. The Angle orthodontist. 74. 487-95. 1 (Year: 2004).*

(Continued)

*Primary Examiner* — Matthew M Nelson  
(74) *Attorney, Agent, or Firm* — 3M IPC

(57) ABSTRACT

An orthodontic bracket is provided, comprising a bracket body configured to couple to an arch member and a first bracket footing disposed adjacent the bracket body. The first bracket footing has at least one major surface that is configured to mate with a receptacle formed from a bracket base, and extends beyond a plane formed by a major surface of the bracket body. In an embodiment, the base can be configured as a polymeric shell portion that is part of a removable dental appliance, wherein the polymeric shell portion can have one or more cavities shaped to receive one or more teeth.

14 Claims, 18 Drawing Sheets

(58) Field of Classification Search
USPC .......................... 433/2, 25, 229, 6, 5, 24, 8
See application file for complete search history.

(56) References Cited

U.S. PATENT DOCUMENTS

| | | | |
|---|---|---|---|
| 4,642,126 A | 2/1987 | Zador | |
| 4,652,274 A | 3/1987 | Boettcher | |
| 5,078,596 A | 1/1992 | Carberry | |
| 5,254,002 A | 10/1993 | Reher | |
| 5,267,855 A | 12/1993 | Tuneberg | |
| 5,356,288 A * | 10/1994 | Cohen | A61C 7/14 433/10 |
| 5,522,725 A * | 6/1996 | Jordan | A61C 7/12 433/8 |
| 5,616,026 A * | 4/1997 | Cash | A61C 7/14 433/8 |
| 5,618,175 A * | 4/1997 | Reher | A61C 7/141 433/16 |
| 5,622,494 A * | 4/1997 | Andreiko | A61C 7/141 433/9 |
| 5,711,665 A * | 1/1998 | Adam | A61C 19/004 433/9 |
| 5,800,162 A * | 9/1998 | Shimodaira | A61C 7/14 433/8 |
| 5,829,972 A * | 11/1998 | Farzin-Nia | A61C 7/16 433/9 |
| 6,648,638 B2 | 11/2003 | Castro | |
| 6,845,175 B2 | 1/2005 | Kopelman | |
| 7,027,642 B2 | 4/2006 | Rubbert | |
| 7,234,937 B2 | 6/2007 | Sachdeva | |
| 7,731,495 B2 | 6/2010 | Eisenberg | |
| 7,819,660 B2 * | 10/2010 | Cosse | A61C 7/14 433/8 |
| 7,845,941 B2 * | 12/2010 | Minium | A61C 7/146 433/16 |
| 8,194,067 B2 | 6/2012 | Raby | |
| 8,479,393 B2 * | 7/2013 | Abels | A61C 7/14 29/896.11 |
| 8,491,306 B2 | 7/2013 | Raby | |
| 8,562,337 B2 * | 10/2013 | Kuo | A61C 7/08 433/6 |
| 8,738,165 B2 | 5/2014 | Cinader, Jr | |
| 8,807,995 B2 * | 8/2014 | Kabbani | A61C 7/30 433/8 |
| 9,498,302 B1 * | 11/2016 | Patel | A61C 7/08 |
| 9,539,064 B2 * | 1/2017 | Abels | A61C 7/14 |
| 10,052,175 B1 * | 8/2018 | Patel | A61C 7/006 |
| 2003/0198911 A1 * | 10/2003 | Knopp | A61C 7/08 433/6 |
| 2004/0029068 A1 | 2/2004 | Sachdeva | |
| 2004/0170941 A1 * | 9/2004 | Phan | A61C 7/08 433/6 |
| 2007/0031791 A1 | 2/2007 | Cinader | |
| 2007/0092849 A1 * | 4/2007 | Cosse | A61C 7/14 433/8 |
| 2008/0020337 A1 * | 1/2008 | Phan | A61C 7/08 433/6 |
| 2008/0109198 A1 * | 5/2008 | Knopp | A61C 7/08 703/11 |
| 2009/0220920 A1 | 9/2009 | Primus | |
| 2013/0325431 A1 | 12/2013 | See | |
| 2015/0238282 A1 | 8/2015 | Kuo | |
| 2016/0000528 A1 * | 1/2016 | Thornton | A61C 7/125 433/8 |
| 2017/0105817 A1 * | 4/2017 | Chun | A61C 7/06 |
| 2017/0319295 A1 * | 11/2017 | Bach | A61C 7/12 |
| 2018/0049847 A1 * | 2/2018 | Oda | A61C 7/20 |

FOREIGN PATENT DOCUMENTS

| | | |
|---|---|---|
| WO | WO 2009-058574 | 5/2009 |
| WO | WO 2009-126433 | 10/2009 |
| WO | WO 2011-034522 | 3/2011 |
| WO | WO 2015-026400 | 2/2015 |
| WO | WO 2016-007646 | 1/2016 |

OTHER PUBLICATIONS

"Undercut." Dictionary.com. 2021 https://www.dictionary.com/browse/undercut# (Feb. 24, 2021) (Year: 2021).*
International Search Report for PCT International Application No. PCT/US2017/066167, dated Mar. 14, 2018, 5 pages.

* cited by examiner

ORTHODONTIC BRACKET FOOTING

CROSS REFERENCE TO RELATED APPLICATIONS

This application is a national stage filing under 35 U.S.C. 371 of PCT/US2017/066167, filed Dec. 13, 2017, which claims the benefit of U.S. Provisional Application No. 62/435,281, filed Dec. 16, 2016, the disclosure of which is incorporated by reference in its entirety herein.

BACKGROUND

This disclosure relates to orthodontics and, more particularly, orthodontic appliances.

The field of orthodontics is concerned with repositioning a patient's teeth for improved function and aesthetic appearance. For example, orthodontic treatment often involves the use of tiny slotted appliances, known as brackets, which are generally fixed to the patient's anterior, cuspid, and bicuspid teeth. An arch member is received in the slot of each bracket and serves as a track to guide movement of the teeth to desired orientations. The ends of the arch member are usually received in appliances known as buccal tubes that are secured to the patient's molar teeth. The arch member and appliances are commonly referred to as "braces." Orthodontic treatment may also be implemented through the use of clear, plastic tooth positioning trays or other functional appliances.

The practice of orthodontics has traditionally relied on manual steps, such as the selection of proper appliances for the particular patient, placement of appliances in the mouth, and adjustment of appliances throughout treatment. More recently, advancement in technology has allowed some of these steps to be assisted through the use of computers. For example, computers can be used to guide the acquisition of data representing the teeth arrangement of an individual patient. Such data can then be used to visualize the patient's dentition to diagnose and assist in orthodontic treatment planning at any stage of treatment. Furthermore, this data can be used in manufacturing appliances, such as brackets, that are customized to the patient.

Orthodontic brackets are typically made to attach to a tooth using an adhesive. Since teeth are different, several sizes and configurations of orthodontic brackets are made which can create manufacturing difficulties. Further, due to the number of possible configurations, a custom fit may not be easily performed. In addition, orthodontic brackets may not reliably adhere to appliances that conform to teeth, such as removable polymeric appliances.

SUMMARY

Aspects of the present disclosure relate to orthodontic brackets with footings to secure the bracket to a bracket base. The bracket base can be separately conformable to a tooth while the bracket can be mass produced.

An orthodontic bracket can include a bracket body configured to couple to an arch member. The orthodontic bracket can also include a first bracket footing disposed adjacent the bracket body. The first bracket footing has at least one major surface that is configured to mate with a receptacle formed from a bracket base. The first bracket footing extends beyond a plane formed by a major surface of the bracket body.

The present disclosure also provides for a method of making an appliance, a removable dental appliance, and a kit. The method can include disposing the bracket base on a tooth and coupling the bracket body with the bracket base via the first bracket footing. The removable dental appliance can include a plurality of polymeric shell portions each having one or more cavities shaped therein to receive one or more teeth. Each of the plurality of shell portions is formed to be separate from the other plurality of shell portions.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

While the above-identified figures set forth several embodiments of the disclosure other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

Definitions

As used herein:

"Mesial" means in a direction toward the center of the patient's curved dental arch.

"Distal" means in a direction away from the center of the patient's curved dental arch.

"Occlusal" means in a direction toward the outer tips of the patient's teeth.

"Gingival" means in a direction toward the patient's gums or gingiva.

"Facial" means in a direction toward the patient's lips or cheeks.

"Lingual" means in a direction toward the patient's tongue.

"Dental surface" includes a tooth structure and includes any base or similar structure attached (e.g., bonded) or adjacent to tooth structure. The structure can be a portion of polymeric tooth shell.

DETAILED DESCRIPTION

The sections below describe illustrative embodiments directed to orthodontic brackets or appliances and methods related thereto. These embodiments are exemplary and accordingly should not be construed to unduly limit the invention. For example, it is to be understood that one of ordinary skill can adapt the disclosed appliances and methods for attachment to either the vestibular or lingual surfaces of teeth, to different teeth within the same dental arch (for example, corresponding appliances on mesial and distal halves of the dental arch), or to teeth located on either the upper or lower dental arches.

The appliances and methods described herein may optionally be customized to the individual patient undergoing treatment. Material and dimensional specifications could also vary from those disclosed herein without departing from the scope of the claimed invention. Unless otherwise specified, the provided appliances and components could be constructed of any of a variety of metal, ceramic, polymeric, and composite materials known to those skilled in the art. Further, unless otherwise indicated, dimensions associated with the appliances and their components are not critical and the accompanying drawings are not necessarily drawn to scale.

Figure 1A:
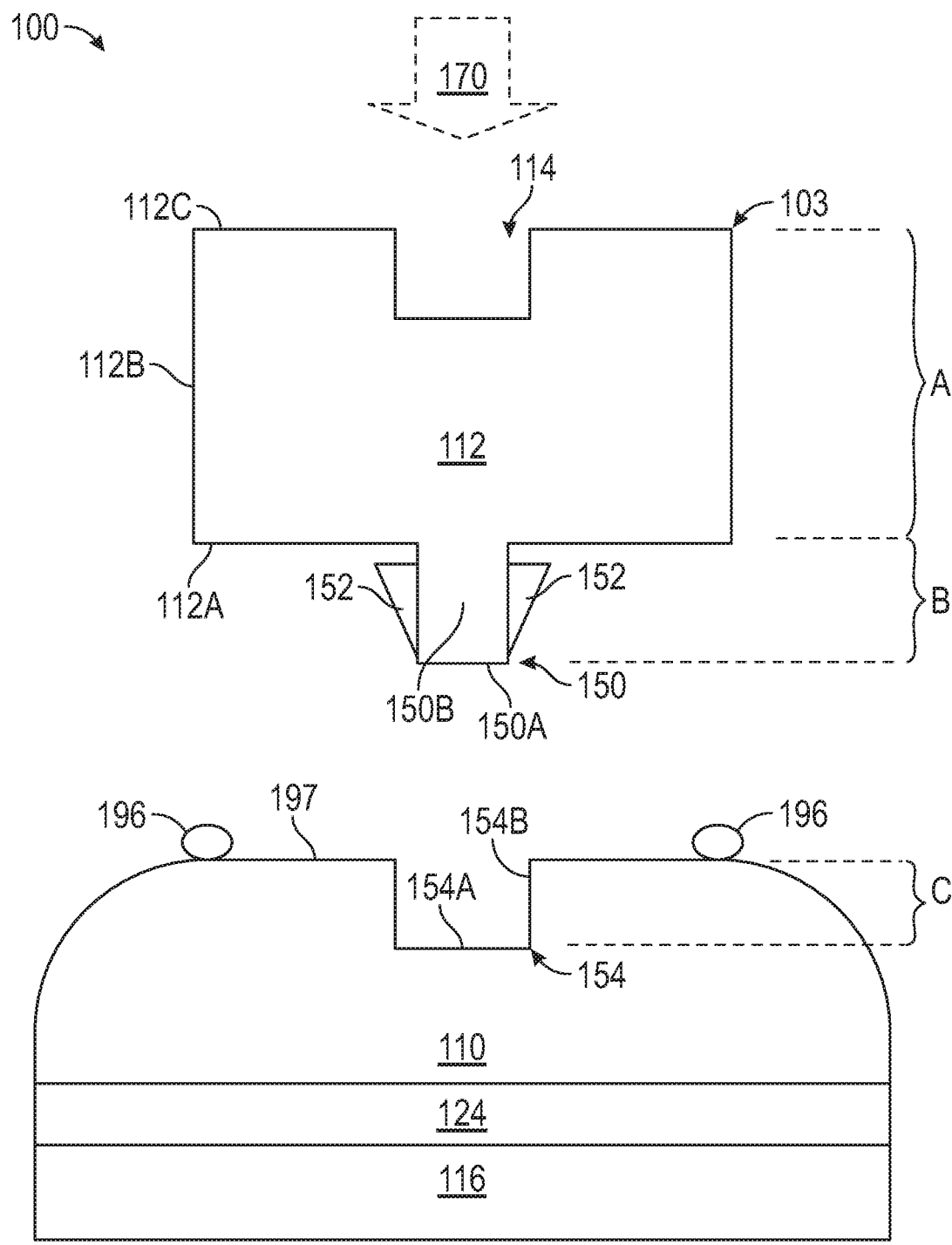
FIG. 1A illustrates a side cross-sectional view of an appliance including an orthodontic bracket with a footing, looking towards its distal side.

FIG. 1A illustrates an orthodontic appliance 100 including a bracket 103 which further includes a bracket body 112, and a bracket footing 150. Optionally, the orthodontic appliance 100 can include an optional bracket base 110.

The bracket body 112 and bracket base 110 are intended to be separate and mate through the footing 150 on the bracket body 112 and the receptacle 154 of the bracket base 110. The bracket base 110 can separately couple to a tooth 116.

The bracket body 112 (which may also be referred to as "body") can be configured to couple to an arch member. The body 112 can have a first major surface 112A, a second major surface 112B, and a third major surface 112C. The first major surface 112A can contact the bracket footing 150. In at least one embodiment, the body 112 can be integral with the bracket footing 150. The second major surface 112B can be the side of the body 112. The third major surface 112C can contact a contact area 114 for securing or attaching the arch member. In at least one embodiment, the third major surface 112C and the second major surface 112B can be referred to as the outer, or facial surface.

The body 112 can have a variety of connection means or securement means to connect the body 112 to the arch member. For example, the arch member can contact the outer surface at the contact area 114. In one example, the body 112 comprises a slot or channel at the contact area 114 configured to receive an arch member sufficient to reposition a tooth. In some embodiments, the bracket further comprises a slot liner for protection from excess friction from a metallic arch member positioned adjacent the contact area 114. The body 112 can include securement means such as tie wings adjacent the contact area 114 or, in certain implementations, the body 112 can comprise a self-ligating latch as disclosed in PCT Publication WO2016007646 (Yick, et al.).

The bracket footing 150 enables the bracket 103 to be securely fastened to the bracket base 110 via the receptacle 154. At least a portion of the bracket footing 150 (which may also be referred to as "footing") is configured to mate with the receptacle 154.

The footing 150 can have a side portion 150B and a base portion 150A (which may refer to a second major surface and a first major surface of the footing, respectively). At least a portion of at least one major surface (e.g., the first major surface 150A or second major surface 150B) can be received in and continuously contact the bracket base 110 (e.g., embed). In some embodiments, at least a portion of at least two major surfaces can continuously contact the bracket base 110. For example, at least the base portion 150A and part of the side portion 150B contact the bracket base 110.

Figure 1B:
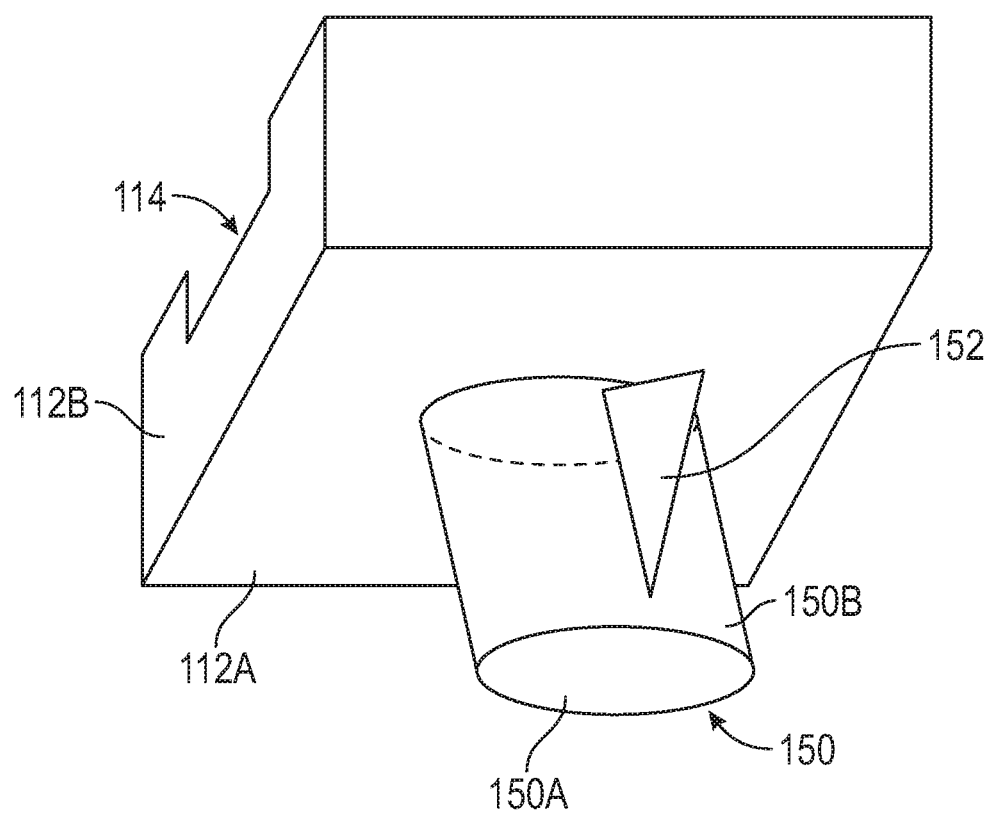
FIG. 1B illustrates a bottom perspective view of an orthodontic bracket with a footing, looking towards its inner side.

The side portion 150B comprises one or more sides. For example, if the footing has a largely circular cross section (as shown in FIG. 1B), then the footing 150 includes one side portion 150B. In at least one embodiment, the side portion 150B can be at least partially contacting the tooth 116. In some embodiments, at least 5%, 10%, at least 20%, at least 30%, at least 40%, at least 50%, at least 60%, at least 70%, at least 80% or at least 90% of the surface area of the side portion 150B and base portion 150A contacts the tooth 116.

The footing 150 can have a particular length B which extends from the bottommost surface of the bracket body major surface 112A to the base portion 150A. The length B of the footing 150 is variable and depends on the expected force applied to the bracket body 112. The length of the bracket footing 150 can be distinguished from a microreplicated surface. For example, the length of the bracket footing 150 can be at least 0.05 mm, 0.1 mm, at least 0.2 mm, at least 0.3 mm, at least 0.4 mm, at least 0.5 mm, at least 0.6 mm, at least 0.7 mm, at least 0.8 mm, at least 0.9 mm, at least 1.0 mm, at least 1.1 mm, at least 1.5 mm, at least 2.0 mm, at least 2.5 mm, at least 3.0 mm, at least 3.5 mm, or at least 4.0 mm. In some embodiments, the major surface 112A can form a plane, wherein the first bracket footing extends beyond the plane.

The footing base 150A can have a variety of cross-sectional shapes as described further herein. For example, the footing base 150A can be a rounded distal portion, a pointed portion, a star or wedge shaped portion, etc.

The height A of the bracket body 112 can be defined by the distance from the bottommost surface of the bracket body 112A to the topmost of the third major surface 112C of the body.

In some embodiments, the length of the footing should be no greater than 90%, no greater than 80%, no greater than 70%, no greater than 60%, no greater than 50%, no greater than 40%, no greater than 30%, or no greater than 20% of height A of the bracket body 112.

The bracket body 112 can have a first cross-sectional area and the bracket footing 150 can have a second cross-sectional area.

In some embodiments, the first and second cross-sectional areas are defined by the largest cross-sectional area of either the body 112 or the footing 150 along parallel planes. In at least one embodiment, the first cross-sectional area is no greater than the second cross-sectional area. In other embodiments, the second cross-sectional area is no greater than the first cross-sectional area. For example, the second cross-sectional area is no greater than 95% no greater than 85% no greater than 75% no greater than 65% no greater than 55%, no greater than 45%, no greater than 35%, no greater than 25%, no greater than 15%, or no greater than 5% of the first cross-sectional area.

In some embodiments, the relationship between the first and second cross-sectional areas are defined by a ratio. For example, the ratio of the first cross-sectional area to the second cross-sectional area can be no greater than 1:1, no greater than 1:1.1, no greater than 1:1.25, no greater than 1:1.5, no greater than 1:2, no greater than 1:3, no greater than 1:4, no greater than 1:5, no greater than 1:6, no greater than 1:7, no greater than 1:8, no greater than 1:9, no greater than 1:10.

The footing 150 can be made of substantially the same materials as the body 112 such as metals, ceramics, or polymers. In some embodiments, the footing 150 and the body 112 are formed as a single piece.

Optionally, the footing 150 can further comprise one or more barbs 152. The barb 152 is generally positioned to prevent the footing from being unintentionally removed from the bracket base 110. The barb 152 can be attached to the footing 150 (either the side portion 150B or the base portion 150A). If attached to the base portion 150A, the barb 152 can have a larger cross-sectional area than the footing 150 to further prevent removal of the bracket 103. The barb 152 can extend in a non-planar direction from the one or more side portions 150B of the footing. Non-planar with the side portion 150B can mean that the barb 152 may extend outward away from the side portion 150B into the bracket base 110. The barb 152 forms an angle of at least 1 to less than 180 degrees as measured from the point of attachment on the side portion 150B (from the base portion) to the end of the barb 152. In another embodiment, the barb 152 can be biased at least 1 degree toward the base 110 meaning that at least a 1 degree angle forms between the barb 152 and the side portion 150B (as measured from the base 110 end of the footing 150). The barb 152 can provide additional securement from the labial/lingual forces applied during removal. Thus, the barb 152 can prevent removal of the bracket 103 from the base 110.

Preferably, the barb 152 forms an angle of at least 90 degrees to less than 180 degrees from the footing base 150A to prevent removal of the bracket 103. The barb 152 can be biased no greater than a 90 degree angle toward the bracket body (as measured from the body end 112 of the footing 150). This may be beneficial during orthodontic treatment to prevent bracket failure. In some embodiments, the barb 152 can be oriented slightly biased mesially toward the direction of the bracket base 110 to facilitate removal or increase stability of the bracket 103 in high tolerance receptacles.

The barb 152 can be stiff such that the bracket base 110 is formed around the footing 150. In situations where the footing 150 is inserted into a base, a flexible barb may be desirable. Generally, flexible means that the barb has a modulus of resilience of at least 0.5 megapascals.

The barb 152 can be substantially straight, meaning that the barb 152 extends along in a single plane. In some embodiments, the barb 152 can form a curve. The barb 152 can be either attached by fixing to the footing 150 or being made movable in relation to the footing 150. If fixed, then the barb can be held to the footing 150 by an adhesive or the barb 152 can be molded with at least the footing 150 to form a single component. If made movable, then the footing 150 or the barb 152 can further comprise a spring.

Each of the barbs can be thin enough to be flexible such that a footing 150 inserted into the base 110 is substantially one-way but thick enough such that the footing 150 does not break away from the base 110 when a force is applied in directions away from the base 110. In this manner, the joining of the footing 150 and the base 110 is substantially one-way.

In at least one embodiment, the barb 152 can ease insertion into the tooth 116 or base 110. For example, the barb 152 may further be coated with a lubricant. The angle of the barb 152 can change in response to the contact with the base 110.

The orthodontic appliance 100 can optionally include a bracket base 110 (which is also referred to as a "base"). The base 110 is configured and positioned to prevent the footing 150 from embedding further and/or stabilize the bracket 103. The base 110 is adjacent to a tooth 116. In some embodiments, the base 110 contacts the tooth 116 through an adhesive 124. The bracket base 110 may lie substantially planar to the tooth 116.

The base 110 can include at least one receptacle 154. The receptacle 154 is configured to mate with the bracket footing 150 and provide further securement for a bracket 103. The receptacle 154 can have at least two major surfaces, major surface 154A (the base portion) and major surface 154B (the side portion). In addition, the receptacle 154 can have a first portion 196, a second portion 197, and a third portion 154B.

The first portion 196 can be elevated relative to the base 110. The first portion 196 can include a border or built out portion. In some embodiments, the first portion 196 can be configured to form a border around at least part of the body 112 (when mated).

The second portion 197 can be depressed relative to the first portion 196. In some embodiments, the second portion 197 can be a major surface of the base 110. The second portion 197 can also be configured to receive and mate with a barb 152. For example, the second portion 197 can allow the bracket 103 to resist rotation when mated with one of the barbs 152.

The third portion 154B can form a plane that is parallel to the plane formed by a major surface 197 of the base 110. The third portion 154 is depressed relative to the second portion and forms a pathway for the footing 150 to mate. The depth C of the receptacle 154 is defined by the distance from the topmost major surface 197 of the base to the bottommost surface of the receptacle 154A. In at least one embodiment, the length B of the footing 150 should be no greater than the depth of the receptacle 154. Alternatively, in at least one embodiment, length B of the footing 150 is at least the depth of the receptacle 154.

In at least one embodiment, the bottommost surface 154A of the receptacle can contact (continuously) the bottommost point of the footing 150A. Likewise, the sidewalls of the receptacle 154B can contact at least one side of the footing 150B (and the barb 152 if present). When inserted, a downward force 170 is applied such that the footing 150B is moved toward the base 110. In some embodiments, an additional rotation force can also be applied with the footing 150 about an axis of rotation. At least a portion of the sides 150B can contact the sidewall of the receptacle 154B (although it is not necessary for 150A to contact 154A).

In certain embodiments, the footing 150, the base 110, or the body 112 may be made, for example, via machine or mold from a polymeric material as disclosed in U.S. Pat. No. 4,536,150A (Garton, et al.), a ceramic material such as a fine grained polycrystalline alumina as disclosed in U.S. Pat. No. 6,648,638 (Castro, et al.), or a polymer-ceramic composite such as glass-fiber reinforced polymeric composites as disclosed in U.S. Pat. No. 5,078,596 (Carberry, et al.) and U.S. Pat. No. 5,254,002 (Reher, et al.). Other suitable materials include, for example, metallic materials (such as stainless steel, titanium, and cobalt-chromium alloys) and plastic materials (such as fiber-reinforced polycarbonate).

In some embodiments, the base 110 can be initially formed without any receptacles and a receptacle 154 can be created using heat to soften the base 110 and applying downward force 170 on the footing 150 to create a receptacle.

The tooth 116, although separate from the appliance 100, can be a variety of biological or polymeric materials, for example, at least a portion of a tooth surface, at least a portion of a gum, at least a portion of soft tissue, or at least a portion of a dental fixture. A dental fixture may include a filling, at least a portion of a bridge, at least a portion of a denture, or a ceramic.

In various embodiments, bracket base 110 is concave and substantially conforms to the convex outer surface of the tooth. In certain embodiments, the tooth 116 may feature a compound contour, with curvature in both the mesial-distal and occlusal-gingival direction.

Figure 2A:
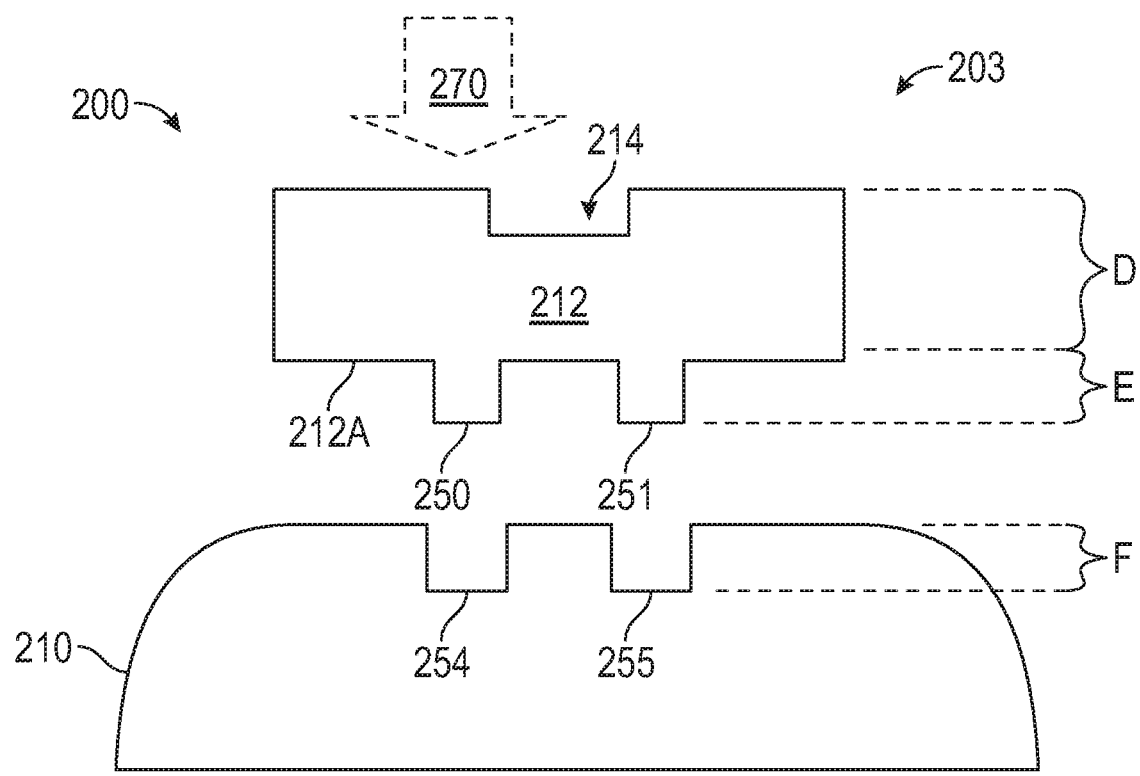
FIG. 2A illustrates a side cross-sectional view of an appliance including orthodontic bracket with a plurality of footings, looking towards its mesial side.
Figure 2B:
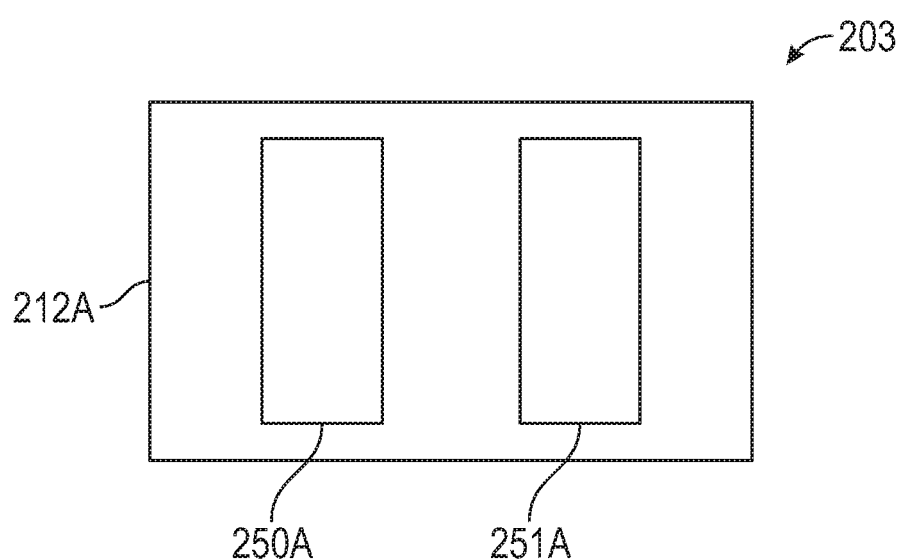
FIG. 2B illustrates a bottom elevational view of an orthodontic bracket with a plurality of footings, looking towards its inner side.

FIGS. 2A-2B illustrate an appliance 200 with a bracket 203 having a plurality of footings. The numbered components of FIGS. 2A-2B can be similar to numbered components found in FIGS. 1A-1B. FIG. 2A illustrates an embodiment of an bracket 203 having at least a body 212, a first bracket footing 250 and a second bracket footing 251. Portions of the first bracket footing 250 or second bracket footing 251 can even be embedded in base 210 as described herein. The body 212 is shown with a contact area 214 illustrated as a slot. The base 210 differs from base 110 in that the first and second portions of the receptacle are not shown.

The bracket 203 shows that height D of the body 212 is defined similarly to height A of body 112 in FIG. 1A.

The base 210 can have a plurality of receptacles 254, 255 sufficient to mate with the footings in the body 212. Determination of the depth F of the receptacles and the length of the footings E is described herein. A downward force 270 can be applied in order to mate the bracket 203 with the base 210. The plurality of footings 250, 251 can enhance the stability of the bracket 203.

FIG. 2B illustrates the bottom face of the body 212A and the bottom face of footings 250A, 251A. The footings 250, 251 are substantially rectangular and spaced-apart to provide stability of the bracket 203. Although the appliance 200 represents one embodiment of the present disclosure, other shapes and configurations may also be used. For example, although only two footings are shown. Configurations having 3 or more, 4, or more, 5 or more footings and receptacles are possible and may result in additional stability.

Figure 3:
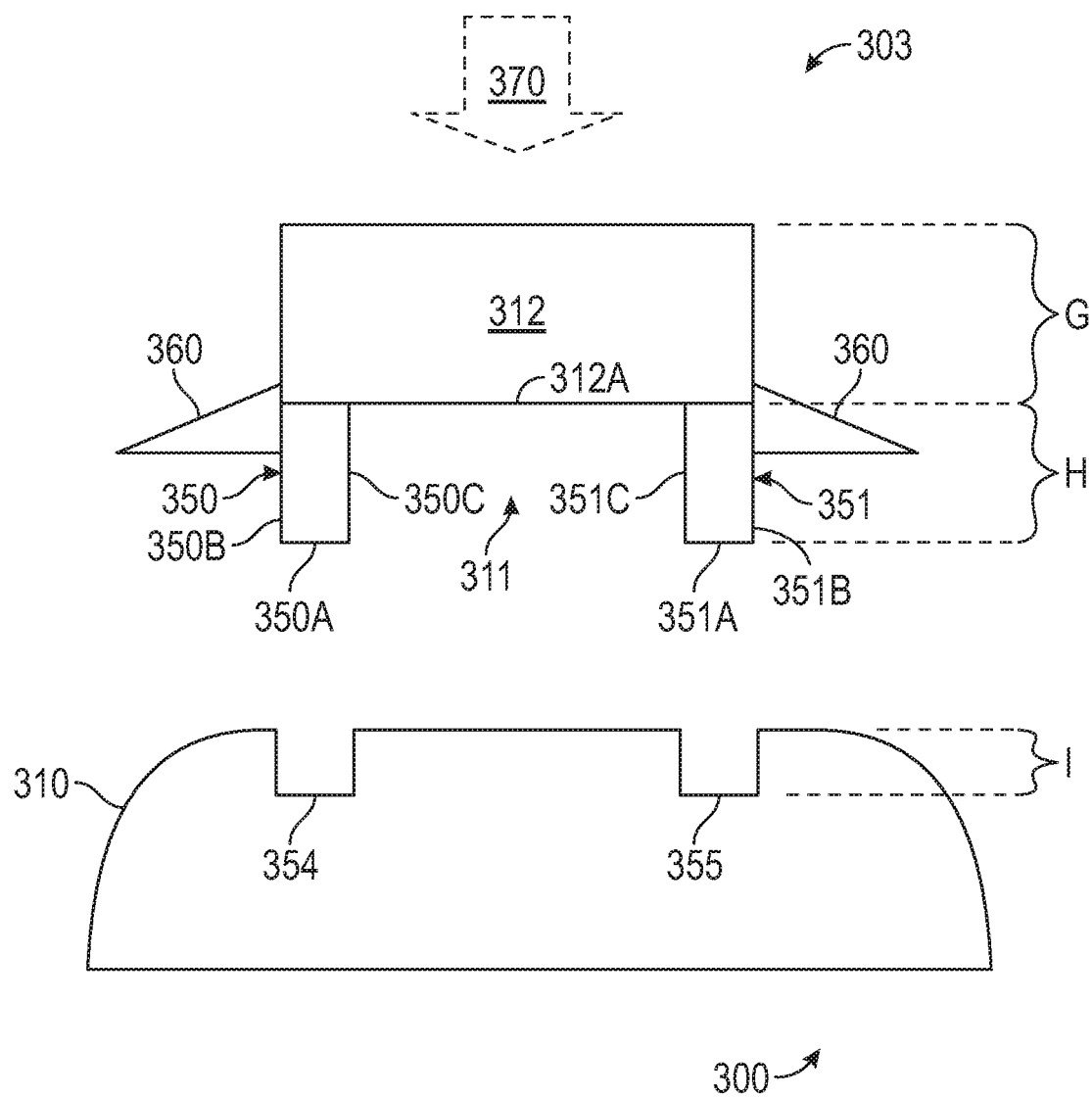
FIG. 3 illustrates a side cross-sectional view of an appliance including an orthodontic bracket, looking towards its distal side.

FIG. 3 illustrates an embodiment of an appliance 300 including a bracket 303 having contact area on at least one inner surface of the bracket. The numbered components of FIG. 3 can be similar to numbered components found in FIGS. 1-2.

The bracket 303 can have a body 312. The body 312 is shown without a slot. The body 312 has a height of G which can include the flanges 360. The flanges 360 can be configured to mate with at least one surface of a base 310 and provide stability to the bracket 303. The flanges 360 are shown positioned such that the bottom face of the flanges 360 is below the plane formed by surface 312A.

The bracket 303 can have a plurality of footings including a first bracket footing 350 and a second bracket footing 351. The footings can have an inner surface 350C, 351C, an outer surface 350B, 351B, and a base surface 350A, 351A. The footings 350, 351 can have a length of H which is defined from a major inner surface 312A to the end of a footing (e.g., 350A, 351A).

The base 310 is shown with a plurality of receptacles 354, 355. The receptacles 354, 355 can be configured similarly to the receptacles 254, 255 in FIG. 2. The receptacles 354, 355 can be equal and have a depth I. In some embodiments, a first receptacle 354 can have a greater depth than a second receptacle 355. The base 310 is shown without a first portion. However, if present, the first portion can border the flanges 360.

The footing length H can be greater than the depth I. When a downward force 370 is applied, the footings 350, 351 can mate with the receptacles 354, 355. The receptacles 354, 355 can partially contacting the inner side and the outer sides of the footings. Thus, the footings extend to depth I. An inner surface and outer surface of the footings 350, 351 are partially exposed, meaning that a portion of the footings 350, 351 do not contact the base 310. In some embodiments, the height can be defined by the exposed portion of the bracket in particular the distance of exposed portion of the footings to the third major surface 312A.

The inner surfaces of the footings 350C, 351C, and the first major surface 312A can further define a space 311 for mounting the arch member. This space 311 may also define a contact area for an arch member discussed herein. The bracket body 312 and footings 350, 351 can optionally contact an arch member with at least one inner surface (i.e., 312A, 350C, 351C). The distance from a plane defined by the topmost major surface of the base 310 to major surface 312A can be at least 0.5 mm and no greater than 6 mm. Preferably, the distance is between 2 to 4 mm (inclusive).

The appliance of FIGS. 1-3 can be further secured to the tooth by attaching the appliance to a tooth. The attaching can include applying adhesive to the appliance and applying a force to the orthodontic bracket toward the tooth. In some embodiments, the tooth can be produce with a hole formed by drilling. The hole can be at least the same size as the footing and the bracket can be mounted directly onto a tooth to avoid use of a base. Additionally, a filling can be used to cover the hole.

Figure 4A:
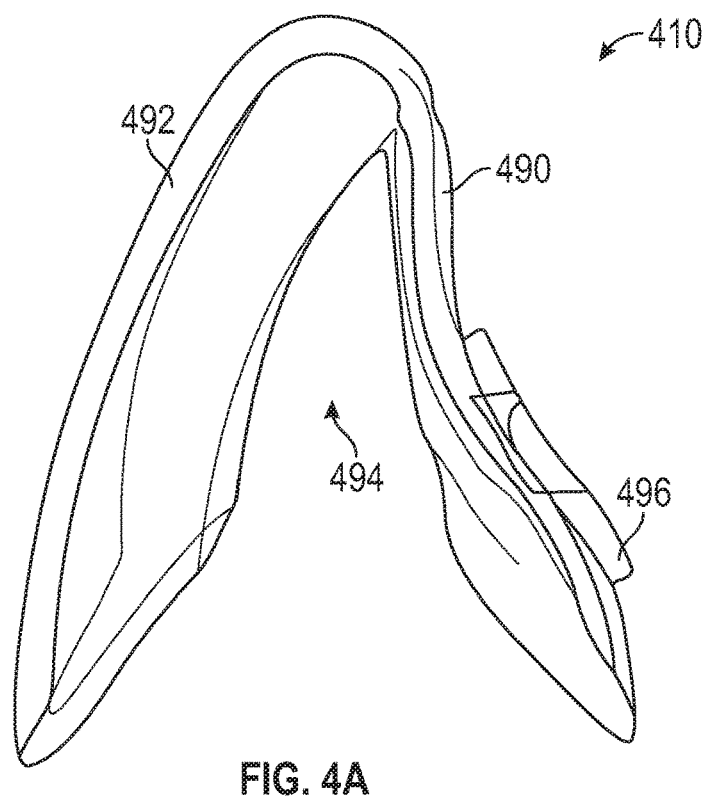
FIG. 4A illustrates a side view of a bracket base, looking towards its distal side.
Figure 4B:
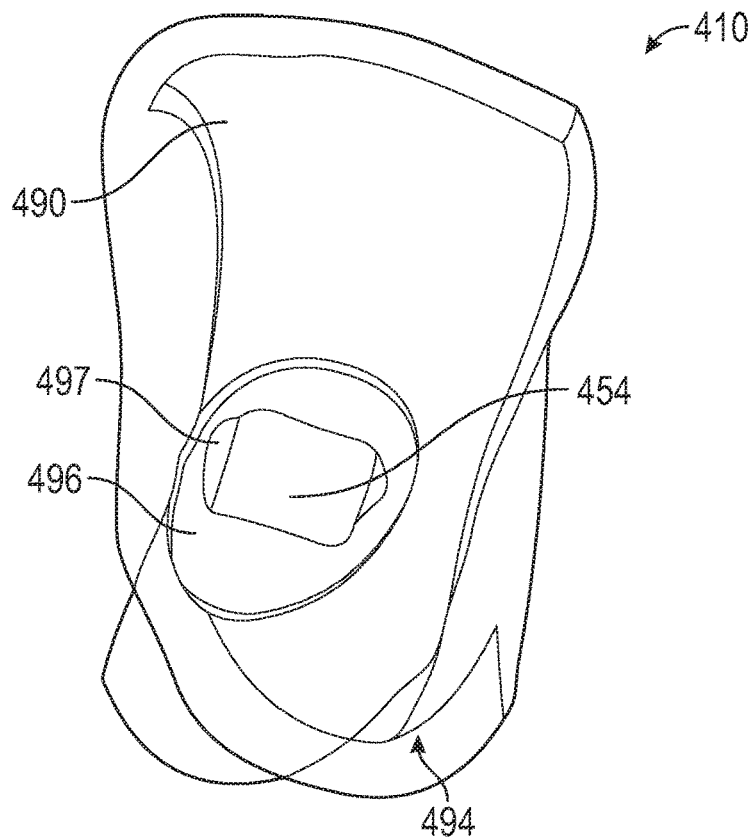
FIG. 4B illustrates a perspective view of a bracket base, looking towards its lingual side.
Figure 5:
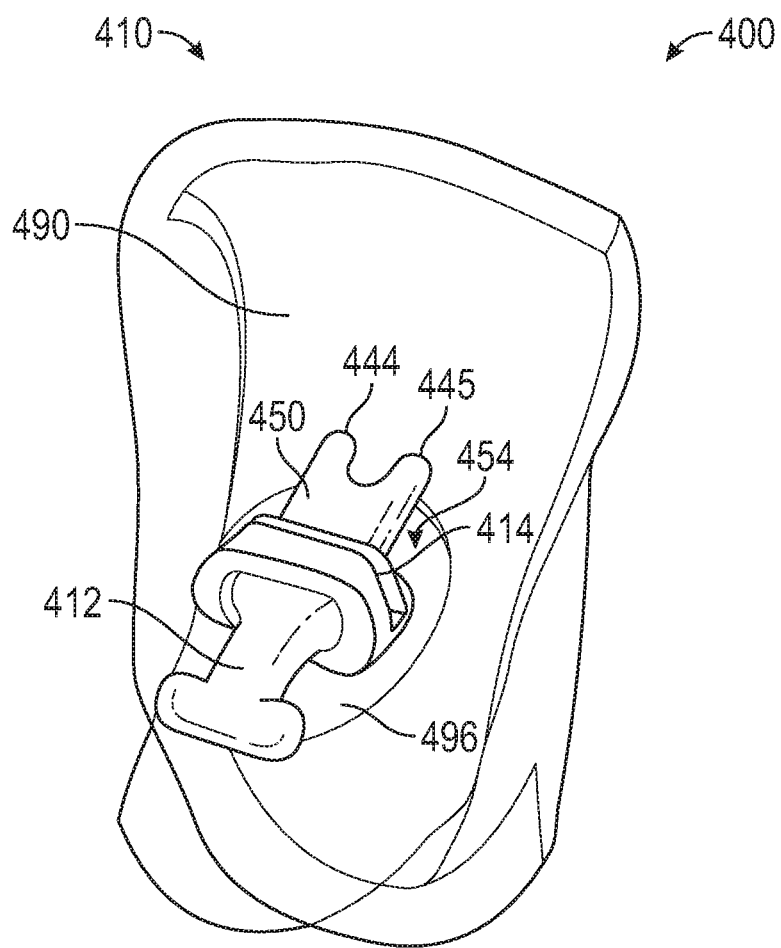
FIG. 5 illustrates a perspective view of a bracket base with an orthodontic bracket, looking towards its lingual side.

FIGS. 4-6 illustrate a bracket configuration using a slot mounted on an outer surface of a bracket and a base where the base is a polymeric shell portion.

FIG. 4A-4B illustrates a base 410 that is configured as a polymeric shell portion that is part of a removable dental appliance (which can be either removable or affixed to one or more teeth). The base 410 can have one or more cavities 494 shaped to receive one or more teeth. In some embodiments, the base 410 can be used to refer to a type of bracket base described herein.

In FIG. 4A, the base 410 (which may be referred to as a "polymeric shell portion" or "shell") can have a vestibular surface 492 and a lingual surface 490. The base 410 can also have a raised portion 496 (e.g., corresponding to the first portion 196 of FIG. 1) on the vestibular surface 492 or on the lingual surface 490 (shown on lingual surface 490). Although a variety of configurations are possible, the lingual surface 490 of the base 410 generally corresponds to the base of FIGS. 1-3.

The first (raised) portion 496 can be raised relative to the lingual surface 490 and forms a plateau that is generally parallel to the plane formed by 490. The first portion 496 is a built out portion relative to the lingual surface 490. For example, if the lingual surface 490 has an average polymeric thickness of 2 mm, then the first portion 496 can be 3 mm thick. The first portion 496 is configured to receive the bracket (not shown) and can possibly border at least one portion of the bracket.

FIG. 4B illustrates the first portion 496 and the second portion 497. The second portion 497 is depressed relative to the first portion 496 and can be optional. In FIG. 4B, the second portion 497 can be used to position at least portion of the bracket. The base 410 can also include the receptacle 454. The receptacle 454 can be planar to the lingual surface 490. In other embodiments, the receptacle 454 has a greater depth relative to the surface of the base 410 (i.e., depressed relative to the lingual surface 490). The receptacle 454 can configured to mate with the bracket footing as shown in FIG. 5.

FIG. 5 illustrates an appliance 400 having the base 410 of FIGS. 4A-4B. The numbered components of FIG. 5 can be similar to numbered components found in FIGS. 1-4. A bracket body 412 can have a footing 450 which has two sections, a first section 444 and a second section 445. The footing 450 can embed into the at least the lingual surface 490 of the base 410 at the receptacle 454.

The appliance 400 can have a body 412 with a contact area 414. The body 412 also has a t-shaped protrusion as a secondary securement area (e.g., tie wing). The body 412 can be adjacent to the raised portion 496.

The length of the footing 450 is shown as greater than the depth of the receptacle 454. Thus, in this embodiment, the footing 450 can penetrate through the base 410 such that the first section 444 and/or the second section 445 contact a tooth. The receptacle 454 thus acts as a guide. To conform to the shape of a tooth, the first section 444 and the second section 445 can be different lengths (thus, either the first section 444 can have a greater length than the second section 445, or vice versa). The footing 450 can be biased at an angle relative to the lingual surface 490. For example, the angle is shown as greater than 90 degrees relative to the plane defined by the lingual surface 490. The receptacle 454 can also align the footing 450 to the desired angle. The first portion 496 can provide a border around the bracket body 412 such that the bracket does not rotate.

Figure 6A:
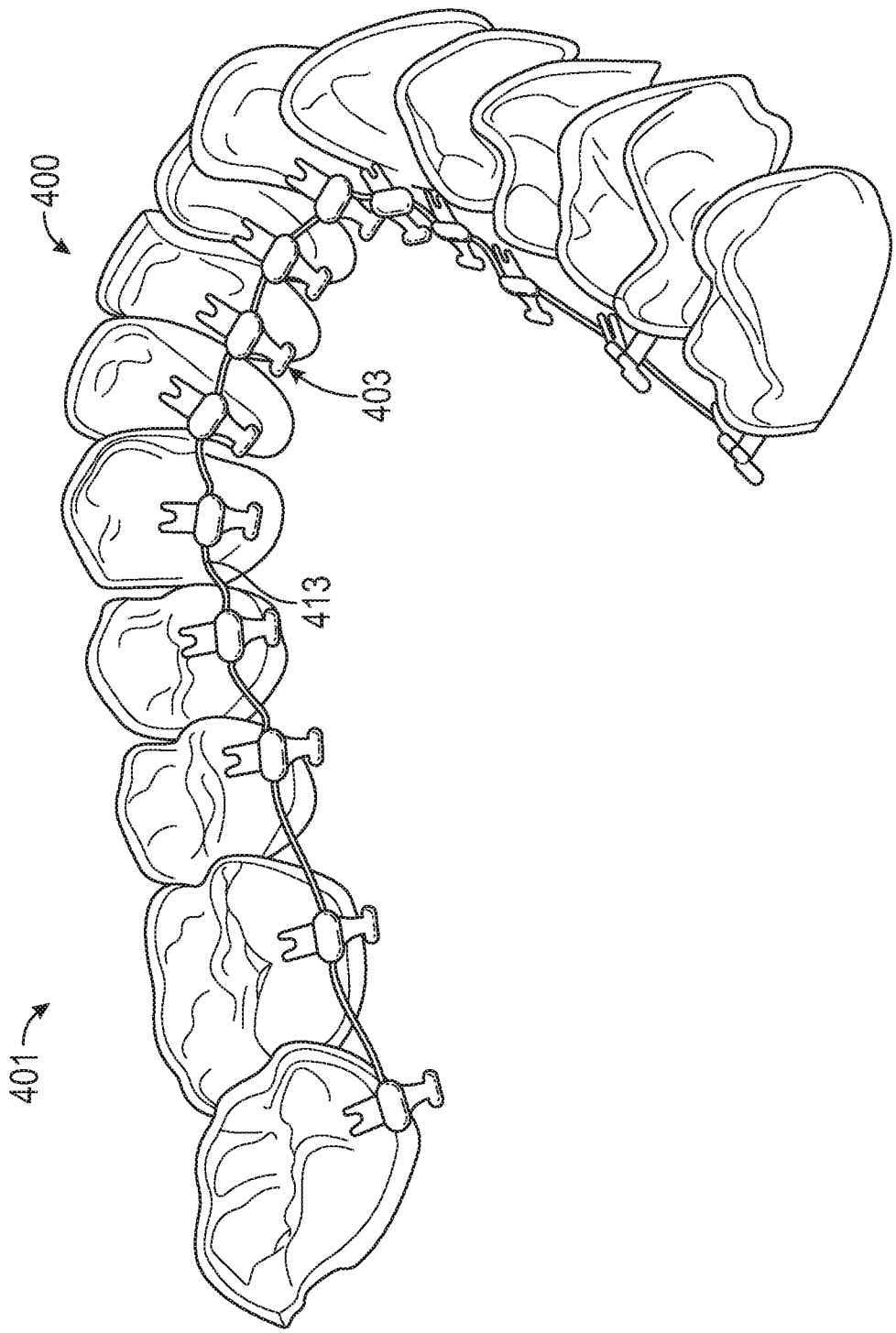
FIG. 6A illustrates a perspective view of an orthodontic appliance with an orthodontic bracket, looking towards its lingual-gingival side.
Figure 6B:
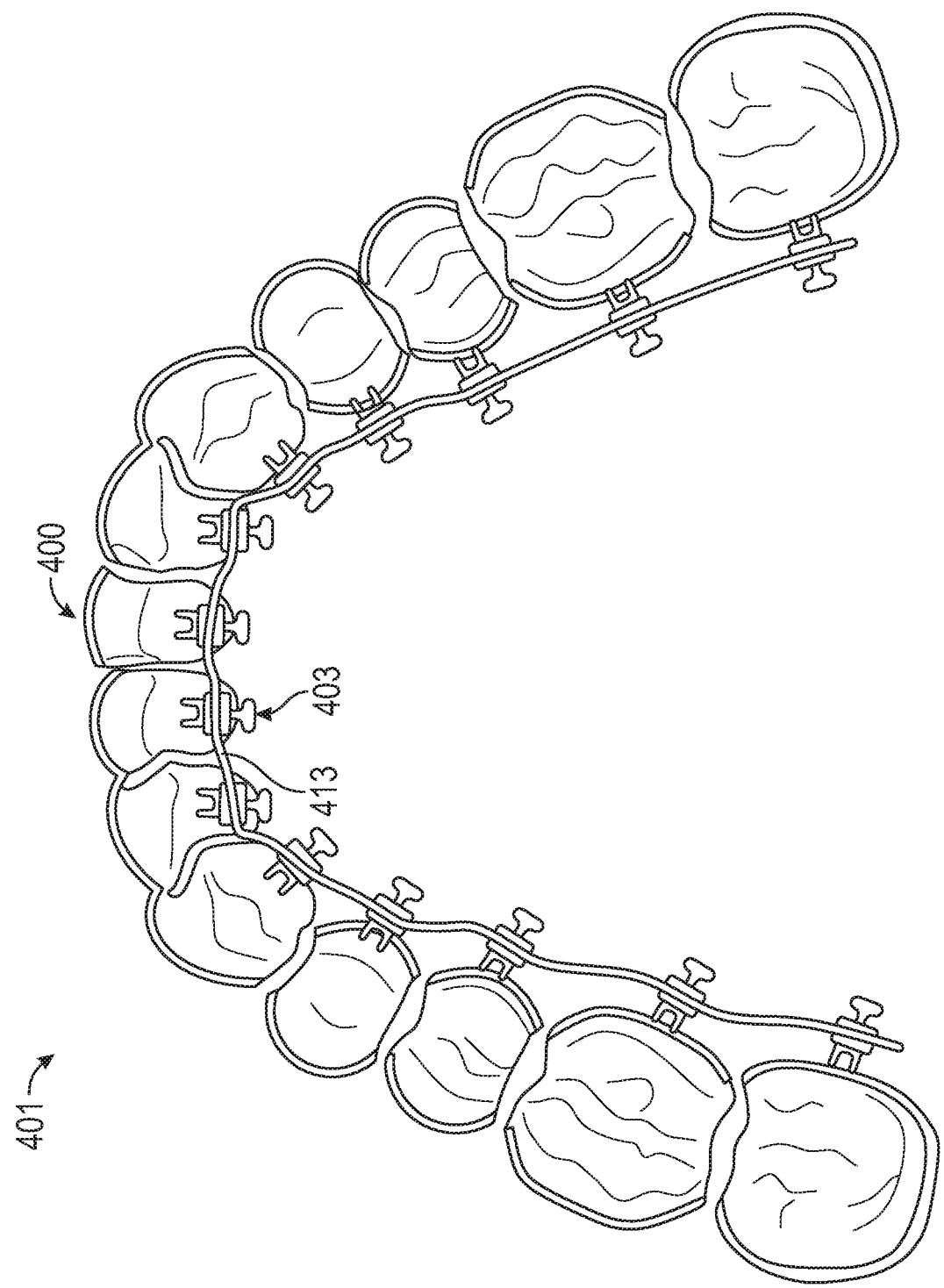
FIG. 6B illustrates a top elevational view of an orthodontic appliance with an orthodontic bracket, looking towards its gingival side.

FIGS. 6A-6B illustrates an embodiment of a plurality of appliances (e.g., appliance 400 from FIG. 5) that are integrated into an appliance 401. The numbered components of FIGS. 6A-6B can be similar to numbered components found in FIGS. 1-5. The appliance 401 can be a removable dental appliance which includes a plurality of polymeric shell portions (i.e., bases 410) each having one or more cavities shaped therein to receive one or more teeth. Each of the plurality of shell portions (e.g., 410) is formed to be separate from the other plurality of shell portions. A polymeric shell portion with a bracket forms the appliance 400 as described in FIG. 5. The appliance 401 can also include one or more of the brackets 403 described herein.

The appliance 401 can also have an arch member 413 attached to the orthodontic bracket 403. The plurality of shell portions can also have one or more shell portions that are coupled to each other, such as through the arch member 413. The arch member 413 provides one or more forces to reposition one or more teeth from a first orientation to a successive orientation.

The arch member 413 can provide a corrective force or forces to one or more teeth of a patient through the appliance 401 to provide an orthodontic treatment or series of treatments to the teeth of a patient. The arch member body of the arch member can include any suitable material or combination of materials that provide a wide range of material properties such as stiffness and resiliency. For example, the arch member body can include metallic material, polymeric material, glass material, and combinations thereof. In one or more embodiments, the arch member body can include at least one of nitinol, stainless steel, nickel titanium, and beta titanium. The arch member body can be a unitary body or can include one or more layers of materials. Further, the arch member body can be unitary along its length. In one or more embodiments, the arch member body can include several portions that are connected together using any suitable technique or combination of techniques.

The arch member body can also be individually configured based on the needs of the practitioner. For example, a given arch member body can be made from stainless steel when a high level of corrective force is desired, nickel titanium for a lower level of force, and beta titanium for an intermediate level of force. In one or more embodiments, the body can include other materials, including non-metallic materials such as polymers or filled composites. Furthermore, the cross-sectional geometry of the body can be tailored to provide the desired corrective force or forces. For example, the shape and/or cross-sectional dimensions (e.g., thickness) of the body can be tailored to provide the desired corrective force or forces. In one or more embodiments, the arch member body can have a cross-sectional geometry that varies along a length of the body.

The arch member body can include any suitable cross-sectional geometry, e.g., shape, area, orientation, etc. The cross-sectional geometry can be constant or vary along a length of the arch member body. For example, the arch member body can take any suitable shape or combination of shapes. The arch member body can also include any suitable cross-sectional shape, e.g., polygonal (e.g., triangular, rectangular, etc.), elliptical, etc. The cross-sectional shape of the arch member body can be uniform along a length of the body. In one or more embodiments, a first portion of the arch member body can have a first cross-sectional shape, and a second portion of the arch member body can have a second cross-sectional shape that is different from the first cross-sectional shape. The arch member body can include a uniform cross-sectional area or a cross-sectional area that varies along the length of the body.

In one or more embodiments, the edges of the arch member body can be smoothed after the body is formed to provide added comfort to a patient. Further, in one or more embodiments, one or more portions of the arch member body can be coated with any suitable material or combination of materials to provide a coating that covers edges of the body to improve comfort. The arch member body can also be covered with one or more protective covers that are applied to the body in portions between arch member couplings such that the body does not have sharp corners but that the couplings can move relative to the body to provide a corrective force or forces to teeth of a patient. The covers can include any suitable material or combination of materials. In one or more embodiments, the covers can provide any desired aesthetic appearance. Further, the covers can include stain resistant material or materials to maintain the aesthetics of the covers.

The arch member body can be adapted to provide any suitable corrective force between two or more arch member couplings. Any suitable technique or combination of techniques can be utilized to provide these corrective forces.

In at least one embodiment, the base 410, and the orthodontic bracket 403 are a single piece, meaning that the bracket 403 is formed at the same time as the base 410 and as a continuous, unbroken material. In another embodiment, the bracket 403 and the arch member 413 are formed as a single piece and installed on the one or more shell portions.

The appliance 401 can have the bracket 403 attached to the lingual side, vestibular side, or both. The robustness or stiffness of the arch member 413 is related to a resiliency of the bracket 403. The arch member 413 can be formed from a polymer and, as described herein, the bracket body can have modulus of elasticity no greater than a modulus of elasticity of the arch member. The arch member 413 can be selected such that the arch member has a lower fracture point than yield point.

Suitable polymerizable components contain at least one ethylenically unsaturated bond, and are capable of undergoing addition polymerization. Such free-radically polymerizable materials include mono-, di- or poly-acrylates and methacrylates such as methyl acrylate, methyl methacrylate, ethyl acrylate, isopropyl methacrylate, n-hexyl acrylate, stearyl acrylate, allyl acrylate, glycerol diacrylate, the diurethane dimethacrylate called UDMA (mixture of isomers, e.g., Rbhm Plex 6661-0) being the reaction product of 2-hydroxyethyl methacrylate (HEMA) and 2,2,4-trimethylhexamethylene diisocyanate (TMDI), glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane, and trishydroxyethyl-isocyanurate trimethacrylate; the bis-acrylates and bis-methacrylates of polyethylene glycols of molecular weight 200-500, copolymerizable mixtures of acrylated monomers such as those in U.S. Pat. No. 4,652,274 (Boettcher et al.), and acrylated oligomers such as those of U.S. Pat. No. 4,642,126 (Zador et al.); and vinyl compounds such as styrene, diallyl phthalate, divinyl succinate, divinyl adipate and divinylphthalate; polyfunctional (meth)acrylates comprising urethane, urea or amide groups, as those of EP2008636 (Hecht et al.). The polymerizable component also may comprise silicone acrylate oligomers, epoxy (meth)acrylate oligomers, polyester (meth)acrylate oligomers or chlorinated polyester (meth)acrylates, allylic oligomers and (meth)acrylic oligomers. Mixtures of two or more of these free radically polymerizable materials can be used if desired.

FIGS. 7-10 illustrate a bracket configuration using a slot on an inner surface of a bracket and a base where the base is a polymeric shell portion.

Figure 7:
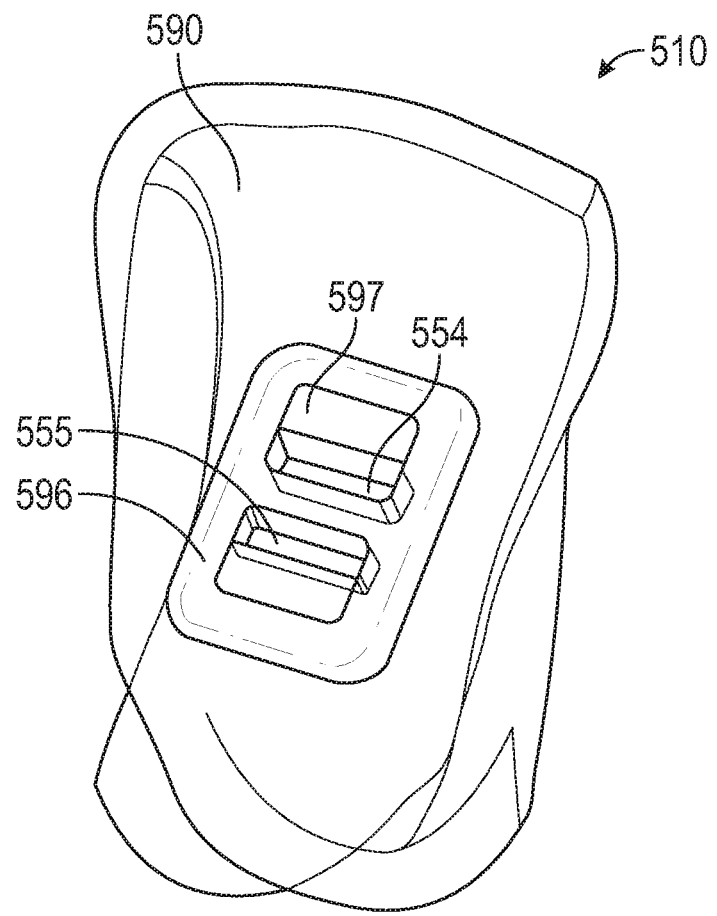
FIG. 7 illustrates a perspective view of a bracket base, looking towards its lingual side.

FIG. 7 illustrates another embodiment of a base 510. The base 510 is similar to the base in FIGS. 3-4 (with similarly numbered components) except that the base 510 has a first, second, and third portions, including a first portion 596, a second portion 597, and a third portion (i.e., receptacle) 554.

The first portion 596 can define the outline of a bracket. The second portion 597 can be raised relative to the third portion 554. The second portion 597 can optionally be coplanar in a plane parallel with the lingual surface 590.

Figure 8A:
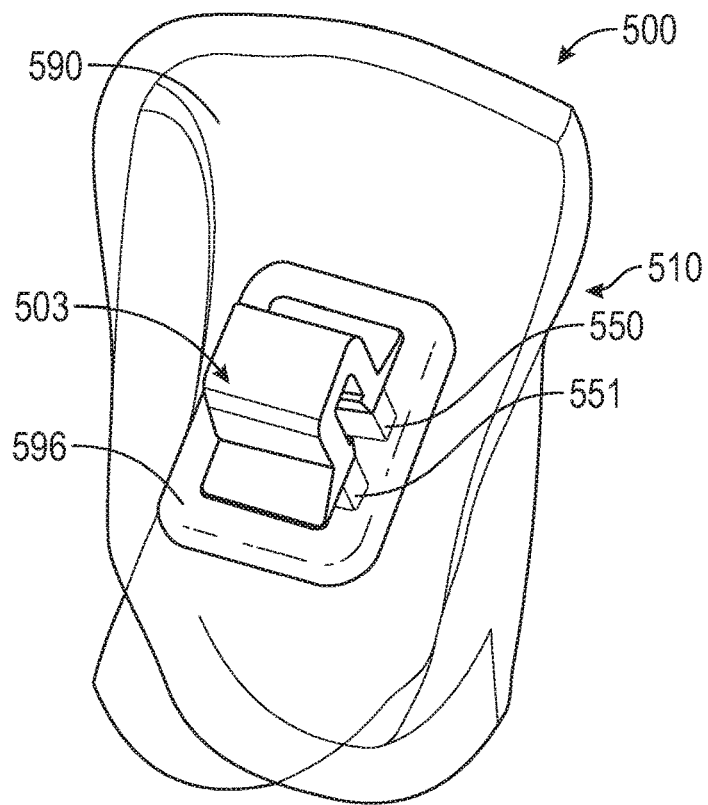
FIG. 8A illustrates a perspective view of a bracket base with an orthodontic bracket, looking towards its lingual side.
Figure 8B:
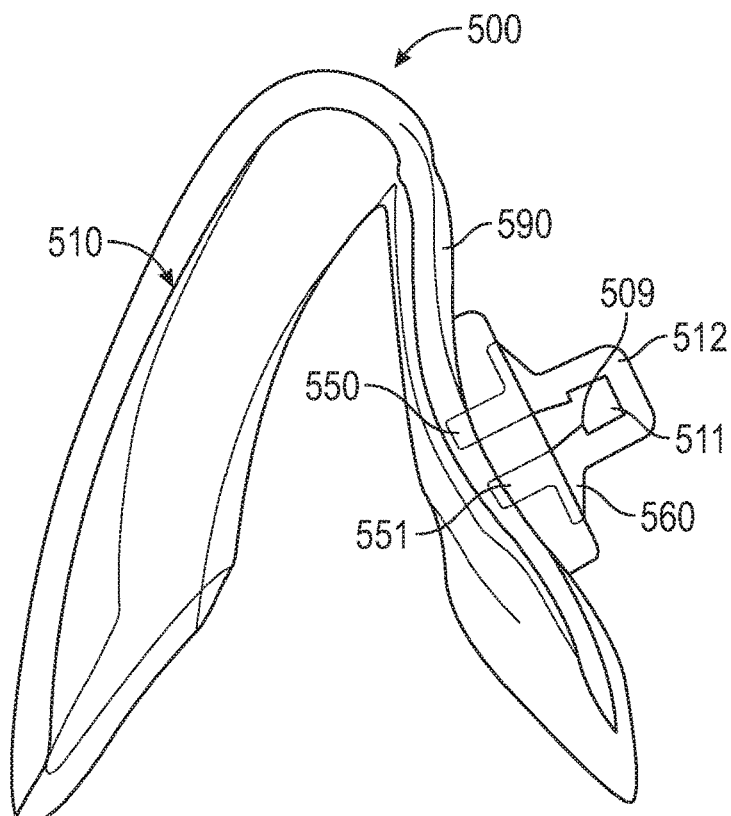
FIG. 8B illustrates a side view of a bracket base with an orthodontic bracket, looking towards its distal side.

FIGS. 8A-8B illustrate an appliance 500 having the base 510 from FIG. 7 (similar to that of appliance 300 from FIG. 3 except that the base 510 is a shell). The numbered components of FIG. 8 can be similar to numbered components found in FIGS. 1-7.

The bracket 503 is shown embedded into the lingual surface 590 of the base 510. A flange 560 can contact the second portion (not shown) and the first portion 596. The footings 550, 551 can contact receptacles formed from the base 510.

The appliance 500 can also have a space 511 comprising at least one inner surface 512 of the bracket 503. The space 511 can further define the contact area for an arch member (not pictured). A plurality of inner securement means 509 may be present to prevent the arch member from releasing. The inner securement means 509 are shown as a protrusion extending outward from the inner surface 512.

Figure 9A:
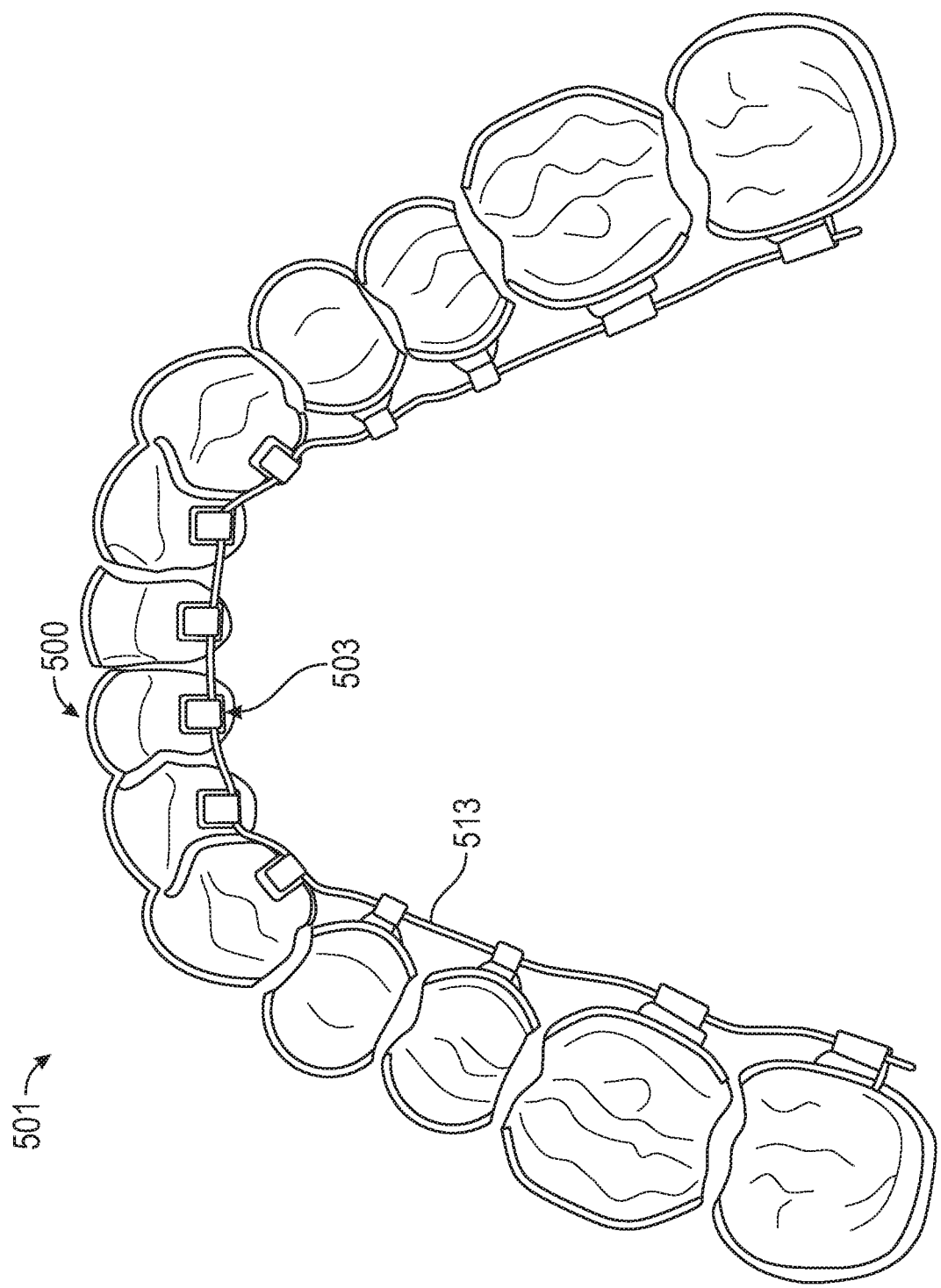
FIG. 9A illustrates a top elevational view of an orthodontic appliance with an orthodontic bracket, looking towards its gingival side.
Figure 9B:
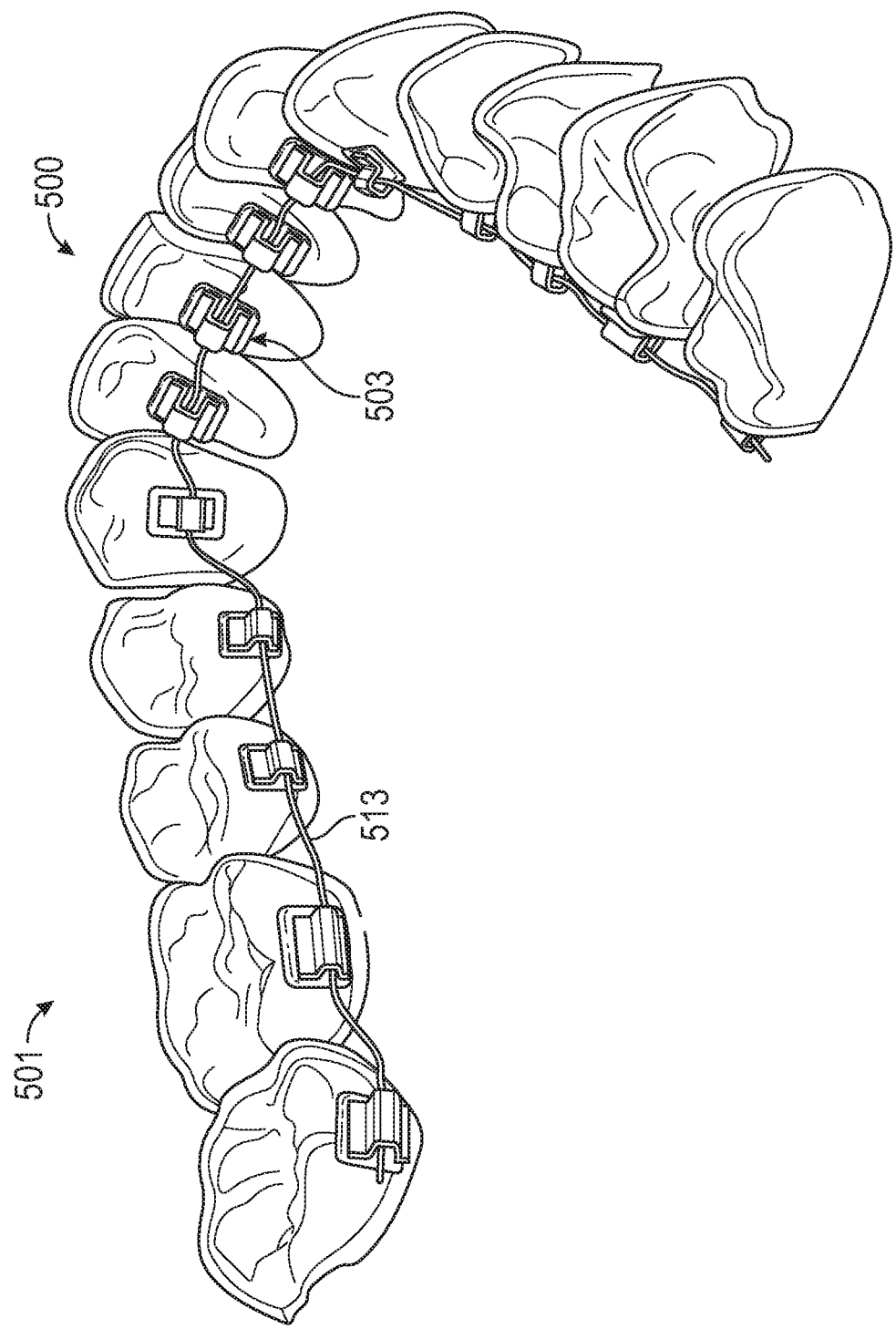
FIG. 9B illustrates a perspective view of an orthodontic appliance with an orthodontic bracket, looking towards its lingual-gingival side.

FIGS. 9A-9B illustrate an orthodontic appliance 501 featuring a plurality of appliances similar to that of the appliance 500 of FIGS. 8A-8B. The numbered components of FIGS. 9A-9B can be similar to numbered components found in FIGS. 1-8.

An arch member 513 can connect the plurality of shell portions with each shell portion (i.e., base 510) having a bracket 503 and thus forming an appliance 500.

The appliance 501 can be made using a variety of methods and assembly techniques. An aspect of the appliance 501 is that the assembly can be performed in a dedicated facility (such as a factory as discussed herein).

To adjust one or more teeth, a user can receive a dental structure of a patient, determine a modification to the dental structure based on the arch member, and form the removable dental appliance 501 based on the dental structure (as discussed herein). For example, a computer can determine the modification by determining dimensions and shapes of a removable dental appliance based on time and forces required to modify the dental structure from an initial position to an adjusted position when the removable dental appliance is worn by the patient. Once formed, (if formed as separate components) the user can also attach the orthodontic bracket and/or appliance described herein to the base or tooth in a location sufficient to perform the modification. The user can further attach the arch member to the orthodontic bracket.

The forming of the dental appliance can start with the forming of the shell portions based on the dental structure. For example, the shell portions can be formed from a polymeric material such as polycarbonate if thermoformed or a methacrylate resin (a poly(meth) acrylate or one or more multi-functional urethane (meth)acrylates) if printed. A plurality of shell portions can be formed with each having at least one cavity shaped to receive one or more teeth. The plurality of shell portions can be connected using a connection means which can be a frangible band of polymer that can be broken by the clinician.

Forming the removable dental appliance optionally includes forming the arch member of any of the preceding embodiments. The arch member can be made using the same apparatus as the shell portions or can be obtained. If formed from a polymer, for example, then the arch member can be printed at substantially the same time as the plurality of shell portions. The fracture point of the polymer can be no greater than that of the yield point in order to provide a visual indication of when the removable dental appliance is no longer functional.

Forming the removable dental appliance can also include attaching the orthodontic bracket of any of the preceding embodiments to at least one of the shell portions sufficient to perform the modification. The attachment point of the orthodontic bracket can occur as recommended to perform the modification. The arch member can be optionally bent to perform the modification and attached to the orthodontic bracket.

The removable dental appliance can be attached to the dental structure of the patient. In some embodiments, the removable dental appliance is removable by the patient. Dental adhesive can be applied to further secure the appliance to the dental structure. In some embodiments, all or portion of the shell portion can be removed.

Figure 10:
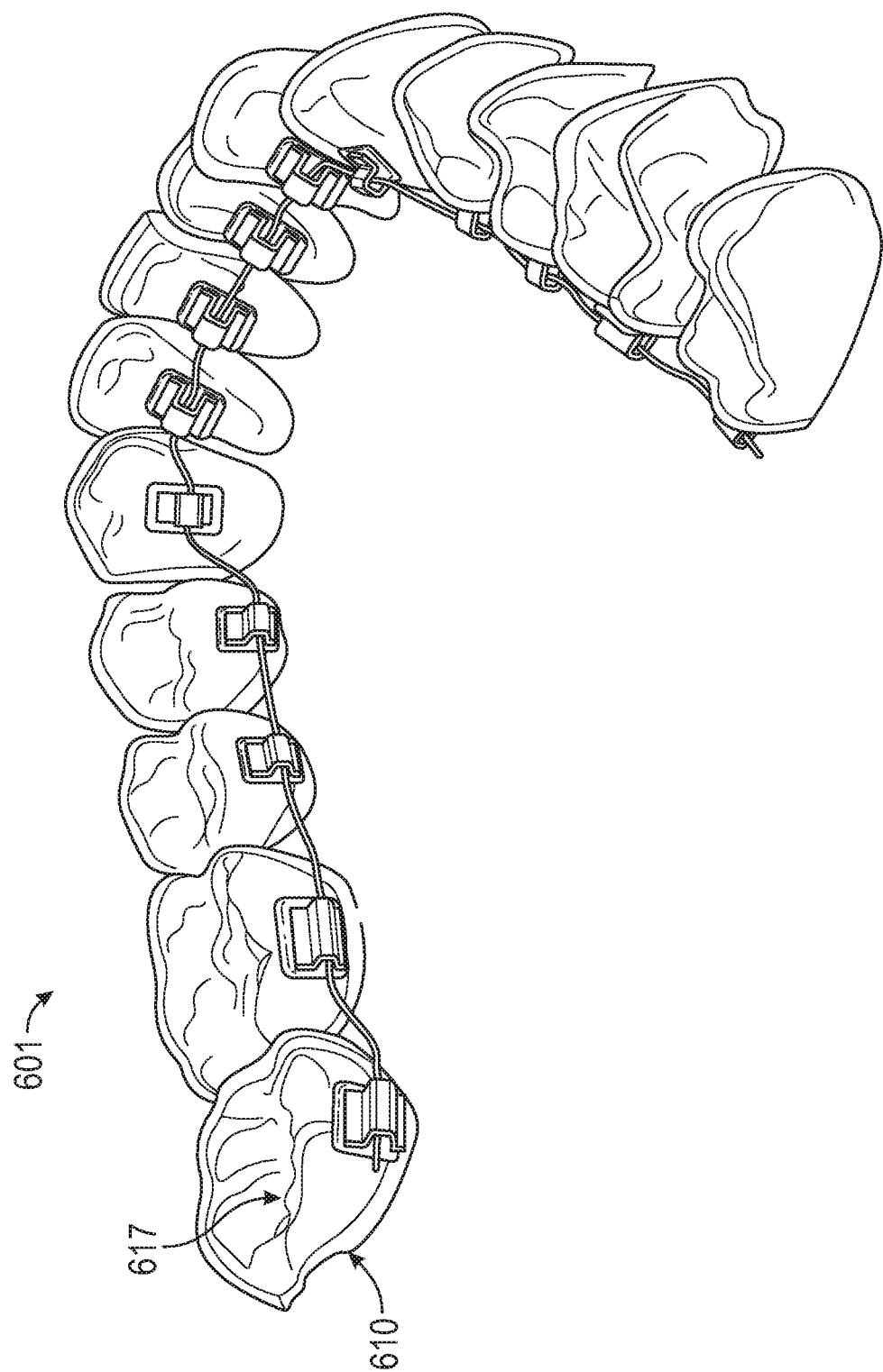
FIG. 10 illustrates a perspective view of an orthodontic appliance with an orthodontic bracket, looking towards its lingual-gingival side.

FIG. 10 illustrates a removable dental appliance 601 similar to that of removable dental appliance 501 in FIG. 9 except that at least one of the polymeric shell portions (i.e., base 610) has a cut-out 617 formed therein. While the base 610 conforms to a tooth, the cut-out 617 can leave at least the occlusal surface tooth exposed. For example, the cut-out can expose at least 50% of the occlusal surface area of the tooth. The exposed tooth can reduce occlusal pressure on the appliance 601.

As described herein, a practitioner can prescribe a series of different appliances. Each dental appliance may prescribe an incremental dentition state. The patient can attach a first dental appliance corresponding to a first dentition state to the teeth. The first dental appliance can optionally be further attached with bonding compound. Once a dentition state is achieved, then a second dental appliance can be applied, corresponding to a second dentition state of the teeth.

Aspects of the present disclosure can also relate to a non-transitory computer readable medium. As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

FIGS. 11-15 illustrate the treatment planning and digital design of various aspects of shell portions disclosed herein.

Figure 11:
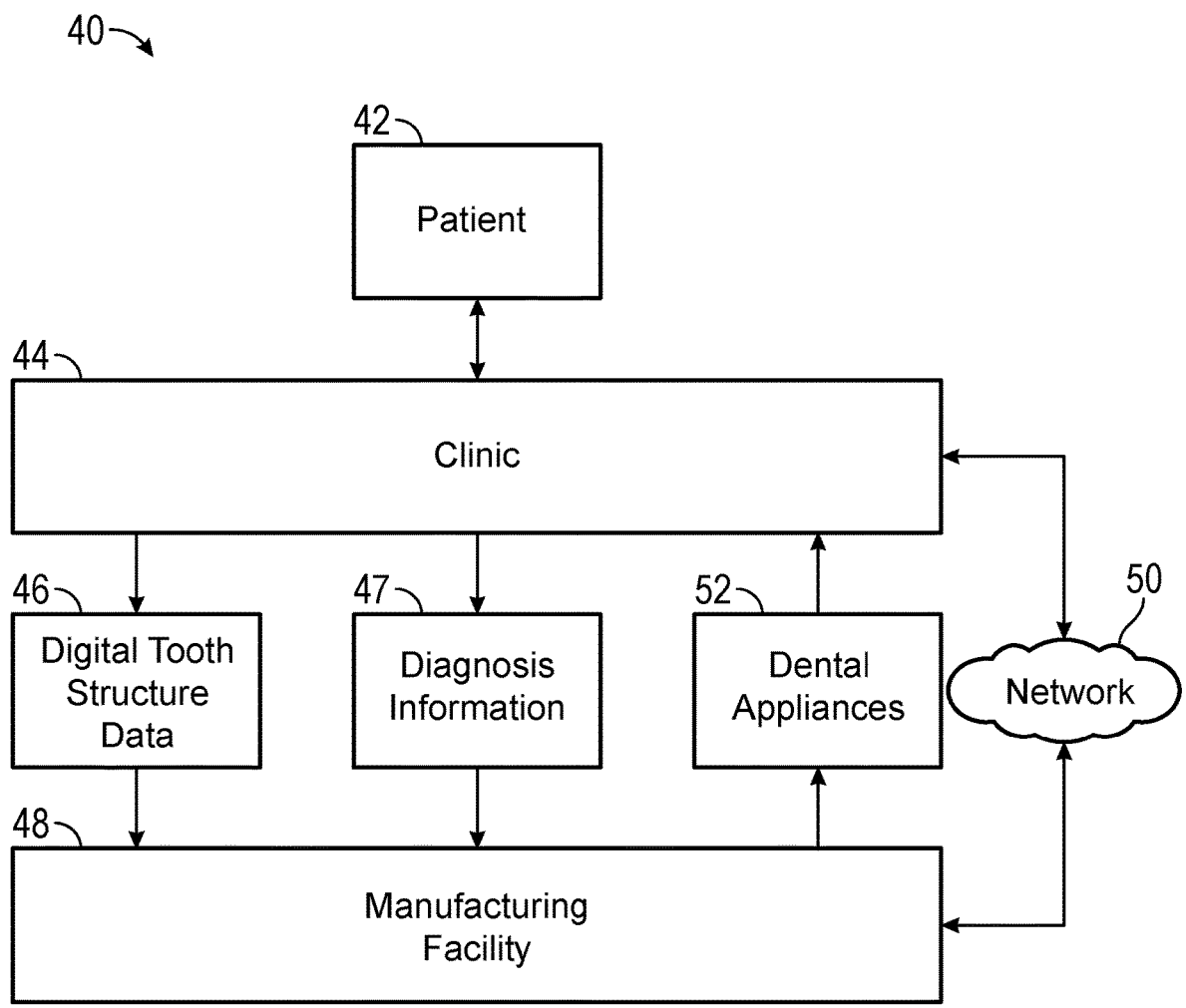
FIG. 11 is a block diagram illustrating an example computer environment in which a clinic and manufacturing facility communicate information throughout a dental appliance manufacturing process.

FIG. 11 is a block diagram illustrating an example computer environment 40 in which clinic 44 and manufacturing facility 48 communicate information throughout a manufacturing process of a set of removable dental appliances 52 for patient 42. Initially, an orthodontic practitioner of clinic 44 generates one or more images of a dental structure of patient 42 using any suitable imaging technique and generates digital dental structure data 46 (e.g., a digital representation of patient's 42 tooth structure). For example, the practitioner may generate X-ray images that can be digitally scanned. Alternatively, the practitioner may capture digital images of the patient tooth structure using, for example, conventional computed tomography (CT), laser scanning, intra-oral scanning, CT scans of dental impressions, scans of dental casts poured from impressions, ultrasound instrumentation, magnetic resonance imaging (MRI), or any other suitable method of 3D data acquisition. In other embodiments, the digital images may be provided using a hand-held intra-oral scanner such as the intra-oral scanner using active wavefront sampling developed by Brontes Technologies, Inc. (Lexington, Mass.) and described in PCT Publication No. WO 2007/084727 (Boerjes, et al.). Alternatively, other intra-oral scanners or intra-oral contact probes may be used. As another option, the digital structure data 46 may be provided by scanning a negative impression of the patient's teeth. As still another option, the digital structure data 46 may be provided by imaging a positive physical model of the patient's teeth or by using a contact probe on a model of the patient's teeth. The model used for scanning may be made, for example, by casting an impression of a patient's dentition from a suitable impression material, such as alginate or polyvinylsiloxane (PVS), pouring a casting material (such as orthodontic stone or epoxy resin) into the impression, and allowing the casting material to cure. Any suitable scanning technique may be used for scanning the model, including those described above. Other possible scanning methods are described in U.S. Patent Publication No. 2007/0031791 (Cinader et al.).

In addition to providing digital images by scanning the exposed surfaces of the teeth, it is possible to image hidden features of the dentition, such as the roots of the patient's teeth and the patient's jaw bones. In some embodiments, the digital tooth structure data is formed by providing several three-dimensional (3D) images of these features and subsequently "stitching" them together. These different images need not be provided using the same imaging technique. For example, a digital image of teeth roots provided with a CT scan may be integrated with a digital image of the teeth crowns provided with an intraoral visible light scanner. Scaling and registering of two-dimensional (2D) dental images with 3D dental images is described in U.S. Pat. No. 6,845,175 (Kopelman, et al.), and U.S. Patent Publication No. 2004/0029068 (Badura et al.), Issued U.S. Pat. No. 7,027,642 (Imgrund et al.), and U.S. Pat. No. 7,234,937 (Sachdeva, et al.) describe using techniques of integrating digital images provided from various 3D sources. Accordingly, the term "imaging" as it is used herein is not limited to normal photographic imaging of visually apparent structures, but includes imaging of dental structures that are hidden from view. The dental structure may include, but is not limited to, any portion of crowns and/or roots of one or more teeth of a dental arch, gingiva, periodontal ligaments, alveolar bone, cortical bone, implants, artificial crowns, bridges, veneers, dentures, orthodontic appliances, or any structure that could be considered part of the dentition before, during, or after treatment.

In order to generate digital tooth structure data 46, a computer transforms raw data from the imaging systems into usable digital models. For example, for raw data representing the shapes of teeth received by a computer, the raw data is often little more than a point cloud in 3D space. Typically, this point cloud is surfaced to create 3D object models of the patient's dentition, including one or more teeth, gingival tissue, and other surrounding oral structure. In order for this data to be useful in orthodontic diagnosis and treatment, the computer may "segment" dentition surfaces to produce one or more discrete, movable 3D tooth object models representing individual teeth. The computer may further separate these tooth models from the gingiva into separate objects.

Segmentation allows a user to characterize and manipulate the teeth arrangement as a set of individual objects. Advantageously, the computer may derive diagnostic information such as arch length, bite setting, and even American Board of Orthodontics (ABO) objective grading from these models. As a further benefit, the digital orthodontic setups may provide flexibility in the manufacturing process. By replacing physical processes with digital processes, the data acquisition step and data manipulation steps can be executed at separate locations without the need to transport stone models or impressions from one location to another. Reducing or eliminating the need for shipping physical objects back and forth can result in significant cost savings to both customers and manufacturers of customized appliances.

After generating digital dental structure data 46, clinic 44 may store digital dental structure data 46 within a patient record in a database. Clinic 44 may, for example, update a local database having a plurality of patient records. Alternatively, clinic 44 may remotely update a central database (optionally within manufacturing facility 48) via network 50. After digital tooth structure data 46 is stored, clinic 44 electronically communicates digital dental structure data 46 to manufacturing facility 48. Alternatively, manufacturing facility 48 may retrieve digital dental structure data 46 from the central database. Clinic 44 may also forward prescription data 47 conveying general information regarding a practitioner's diagnosis and treatment plan for patient 42 to manufacturing facility 48. In some examples, prescription data 47 may be more specific. For example, digital dental structure data 46 may be a digital representation of the dental structure of patient 42, and the practitioner of clinic 44 may review the digital representation and indicate desired movement, spacing or final positions of individual teeth of patient 42 following treatment with the set of removable dental appliances 52 prior to forwarding digital dental structure data 46 to manufacturing facility 48. Manufacturing facility 48 may be located off-site, or located with clinic 44.

For example, each clinic 44 may include its own equipment for manufacturing facility 48 such that a treatment plan and digital design may be performed entirely by a clinical practitioner, or an assistant, in the clinical setting, using software installed locally. The manufacturing may be performed in the clinic, as well, by using a 3D printer (or by other methods of additive manufacturing). A 3D printer allows manufacturing of intricate features of a dental appliance or a physical representation of the dental structure of patient 42 through additive manufacturing. The 3D printer may use iterative digital designs of the original dental structure of patient 42, as well as a desired dental structure of patient 42, to produce multiple digital appliances and/or digital appliance patterns customized to produce the desired dental structure of patient 42. Manufacturing may include post-processing to remove uncured resin and support structures, or to assemble various components, which may also be necessary and could also be performed in a clinical setting.

Manufacturing facility 48 utilizes digital dental structure data 46 of patient 42 to construct the set of removable dental appliances 52 in order to reposition teeth of patient 42. Sometime thereafter, manufacturing facility 48 forwards the set of removable dental appliances 52 to clinic 44 or, alternatively, directly to patient 42. For example, the set of removable dental appliances 52 may be an ordered set of removable dental appliances. Patient 42 then wears the removable dental appliances in the set of removable dental appliances 52 sequentially over time according to a prescribed schedule in order to reposition the teeth of patient 42. For example, patient 42 may wear each removable dental appliance in the set of removable dental appliances 52 for a period of between about 1 week and about 12 weeks, such as between about 3 weeks and about 10 weeks or between about 4 weeks and about 8 weeks. Optionally, patient 42 may return to clinic 44 for periodic monitoring of the progress of the treatment with removable dental appliances 52.

During such periodic monitoring, a clinician may adjust the prescribed schedule of patient 42 for wearing the removable dental appliances in the set of removable dental appliances 52 sequentially over time. Monitoring generally includes visual inspection of the teeth of patient 42 and may also include imaging to generate digital tooth structure data. In some relatively uncommon circumstances, the clinician may decide to interrupt the treatment of patient 42 with the set of removable dental appliances 52, for example, by sending the newly generated digital dental structure data to manufacturing facility 48 in order to produce a new set of removable dental appliances. In the same or different examples, the clinician may send newly generated digital dental structure data to manufacturing facility 48 following the completion of the prescribed schedule of the treatment with removable dental appliances 52. In addition, following the completion of the prescribed schedule of the treatment with removable dental appliances 52, the clinician may request a new set of removable dental appliances from manufacturing facility 48 to continue treatment of patient 42.

Figure 12:
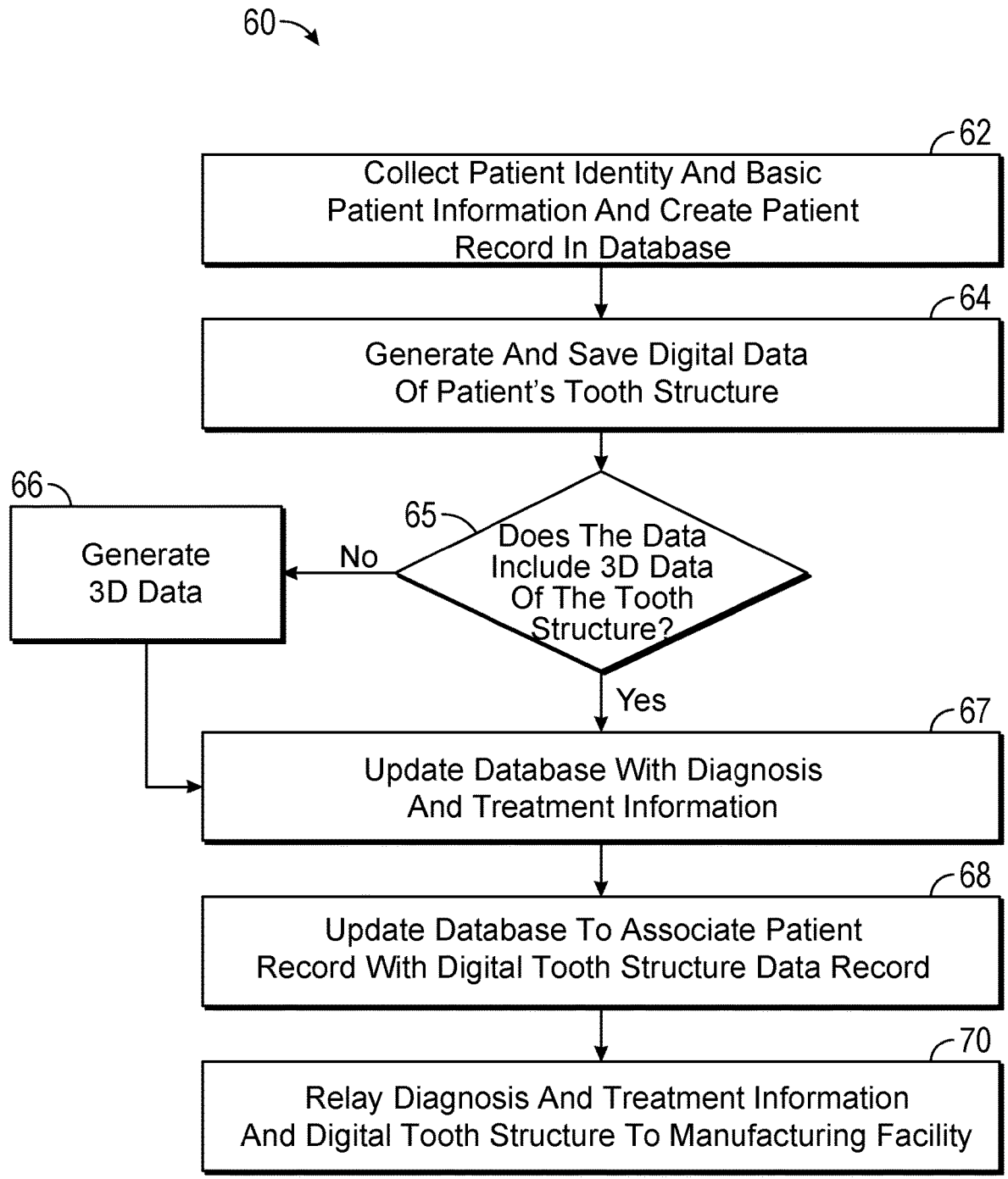
FIG. 12 is a flow diagram illustrating a process conducted at the clinic in accordance with one example of this disclosure.

FIG. 12 is a flow diagram illustrating process 60 conducted at clinic 44 in accordance with one example of this disclosure. In block 62, a practitioner at clinic 44 collects patient identity and other information from patient 42 and creates a patient record. As described, the patient record may be located within clinic 44 and optionally configured to share data with a database within manufacturing facility 48. Alternatively, the patient record may be located within a database at manufacturing facility 48 that is remotely accessible to clinic 44 via network 50 or within a database that is remotely accessible by both manufacturing facility 48 and clinic 44.

In block 64, digital data 46 of the dental structure of patient 42 may be generated and saved using any suitable technique to thereby create a virtual dental structure. Digital data 46 may be comprised of a two-dimensional (2D) image and/or a three-dimensional (3D) representation of the dental structure.

In one example, 3D representations of a dental structure are generated using a cone beam computerized tomography (CBCT) scanner, such as an i-CAT™3D dental imaging device, which is available from Imaging Sciences International, LLC; 1910 N Penn Road, Hatfield, Pa. Clinic 44 stores the 3D data 46 (in the form of radiological images) generated from the CBCT scanner in the database located within clinic 44, or alternatively, within manufacturing facility 48. The computing system processes the digital data 46 from the CBCT scanner, which may be in the form of a plurality of slices, to compute a digital representation of the tooth structure that may be manipulated within the 3D modeling environment.

In block 65, the computing system can determine whether the data includes 3D data of the tooth structure. If not, the practitioner may further generate 3D digital data in block 66. The 3D data 46 may be produced by, for example, forming and subsequently digitally scanning a physical impression or casting of the tooth structure of patient 42. For example, a physical impression or casting of a dental arch of patient 42 may be scanned using a visible light scanner, such as an OM-3R scanner available from Laser Design, Inc. of Minneapolis, Minn. Alternatively, the practitioner may generate the 3D data 46 of the occlusal service by use of an intra-oral scan of the dental arch of patient 42, or existing 3D tooth data. In one example, the method of forming a digital scan from a casting or an impression described in U.S. Pat. No. 8,491,306, titled, "REGISTERING PHYSICAL AND VIRTUAL TOOTH STRUCTURES WITH PEDESTALS," and issued on Jul. 23, 2013, may be used. In the same or different examples, techniques for defining a virtual tooth surface and virtual tooth coordinate system as described in U.S. Patent Application Publication No. 2013/0325431, titled ORTHODONTIC DIGITAL SETUPS," and published on Dec. 5, 2013 may be used. In any case, the digital data are digitally registered within the 3D modeling environment to form a composite digital representation of a tooth structure, which may include the tooth roots as well as the occlusal surfaces.

In one example, 2D radiological images and the 3D digital data for the occlusal surface of the dental arch are registered by first attaching registration markers (e.g., fiducial markers or a pedestal having known geometry) to the tooth structure of patient 42 prior to generating both the radiological images and the 3D digital scan. Thereafter, the digital representation of the registration markers within the 2D radiological image and the 3D digital data may be aligned within a 3D modeling environment using registration techniques described in U.S. Pat. No. 8,491,306.

In another example, 3D digital data of the tooth structure is generated by combining two 3D digital representations of the tooth structure. For example, a first 3D digital representation may be a relatively low resolution image of the roots obtained from a CBCT scanner (e.g., an i-CAT™3D dental imaging device) and the second 3D digital representation may be a relatively high resolution image of the crowns of the teeth obtained from an industrial CT scan of an impression or a visible light (e.g., laser) scan of a casting of the dental arch of the patient. The 3D digital representations may be registered using a software program that enables the 3D representations to be manipulated within a computer environment (e.g., Geomagic®Studio software, available from 3D Systems, Inc.; 333 Three D Systems Circle, Rock Hill, S.C.), or alternatively, registration techniques described in U.S. Pat. No. 8,491,306 may be used.

If the data includes 3D data of the tooth structure in block 65, then the process 60 can continue to block 67. In block 67, a computer system can update the database with diagnosis and treatment information. A computer system executing 3D modeling software renders a resultant digital representation of the tooth structure, including the occlusal surface as well as the root structure of the patient's dental arch. Modeling software provides a user interface that allows the practitioner to manipulate digital representations of the teeth in 3D space relative to the digital representation of the patient's dental arch. By interacting with the computer system, the practitioner generates treatment information, such as by selecting indications of the desired final positions or the teeth of patient 42. In block 68, a database is updated to associate patient records with the digital tooth structure data records. For example, once the practitioner has finished conveying general information regarding a diagnosis and treatment plan within the 3D environment, the computer system updates the database associated with the patient record to record the prescription data 47 conveying general information regarding a diagnosis and treatment plan as specified by the practitioner.

In block 69, the prescription data 47 (e.g., the diagnosis and treatment information and digital tooth structure) is relayed to manufacturing facility 48 in order for manufacturing facility 48 to construct one or more removable dental appliances, such as removable dental appliances 52.

Although described with respect to an orthodontic practitioner located at an orthodontic clinic, one or more of the steps discussed with respect to process 60 may be performed by a remote user, such as a user located at manufacturing facility 48. For example, the orthodontic practitioner may only send radiological image data and an impression or casting of the patient to manufacturing facility 48, where a user interacts with a computer system to develop a treatment plan within a 3D modeling environment.

Optionally, a digital representation of the treatment plan within the 3D modeling environment may then be transmitted to the orthodontic practitioner of clinic 44, who may review the treatment plan and either send back his or her approval, or indicate desired changes.

Figure 13:
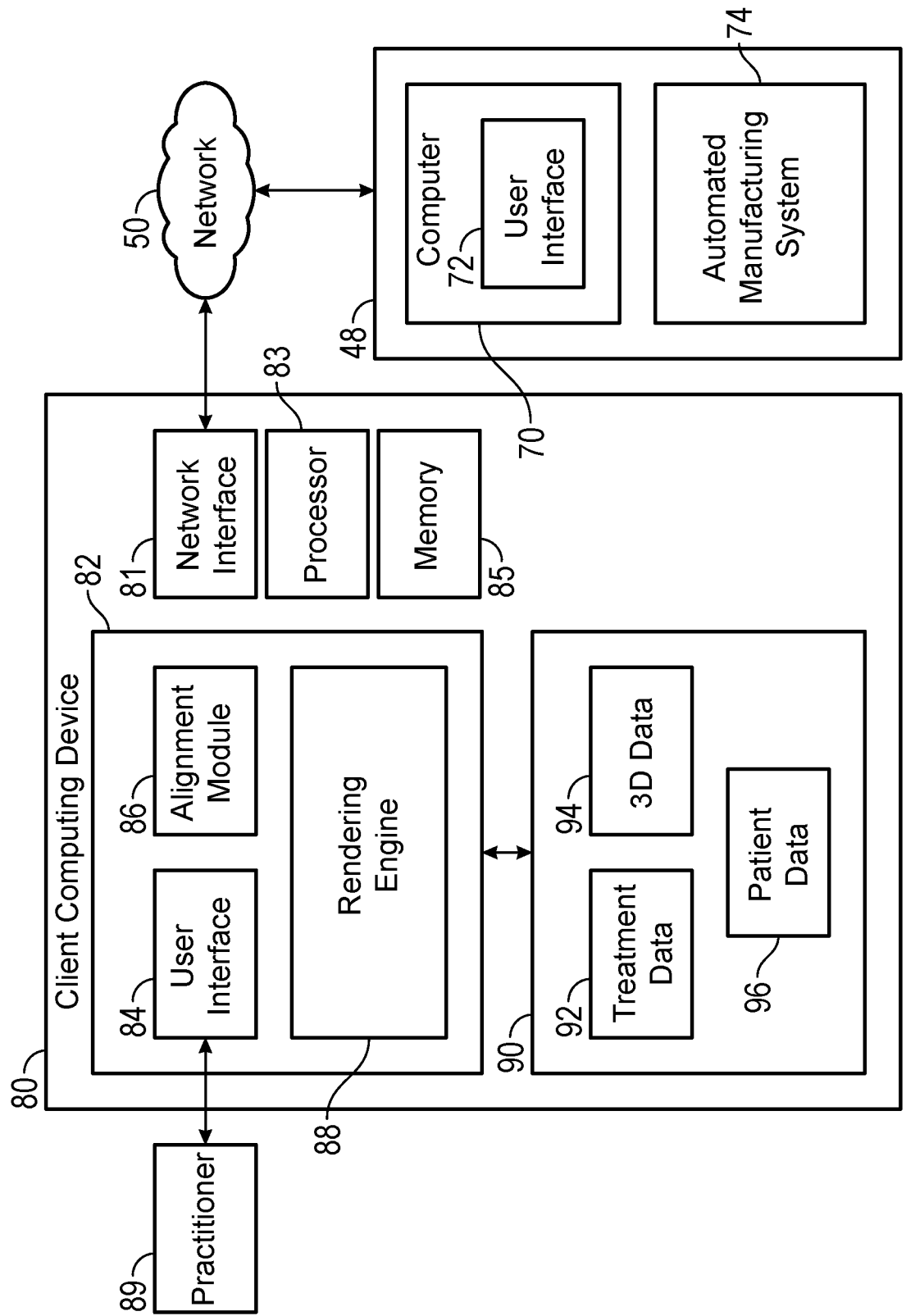
FIG. 13 is a block diagram illustrating an example of a client computing device connected to a manufacturing facility via a network.

FIG. 13 is a block diagram illustrating an example of a client computing device 80 connected to manufacturing facility 48 via network 50. In the illustrated example, client computing device 80 provides an operating environment for modeling software 82. Modeling software 82 presents a modeling environment for modeling and depicting the 3D representation of the teeth of patient 42. In the illustrated example, modeling software 82 includes user interface 84, alignment module 86, and rendering engine 88.

User interface 84 provides a graphical user interface (GUI) that visually displays the 3D representation of patient's 42 teeth. In addition, user interface 84 provides an interface for receiving input from practitioner 89 of clinic 44 (FIG. 11), e.g., via a keyboard and a pointing device, for manipulating patient's 42 teeth within the modeled dental arch.

Modeling software 82 may be accessible to manufacturing facility 48 via network interface 81. Modeling software 82 interacts with database 90 to access a variety of data, such as treatment data 92, 3D data 94 relating to the tooth structure of patient 42, and patient data 96. Database 90 may be represented in a variety of forms including data storage files, lookup tables, or a database management system (DBMS) executing on one or more database servers. The database management system may be a relational (RDBMS), hierarchical (HDBMS), multi-dimensional (MDBMS), object oriented (ODBMS or OODBMS) or object relational (ORDBMS) database management system. The data may, for example, be stored within a single relational database, such as SQL Server from Microsoft Corporation. Although illustrated as local to client computing device 80, database 90 may be located remote from the client computing device and coupled to the client computing device via a public or private network, e.g., network 50.

Treatment data 92 describes a diagnosis and/or repositioning information of the teeth of patient 42 selected by practitioner 89 and positioned within the 3D modeling environment.

Patient data 96 describes a set of one or more patients, e.g., patient 42, associated with practitioner 89. For example, patient data 96 specifies general information, such as a name, date of birth, and a dental history, for each patient.

Rendering engine 88 accesses and renders 3D data 94 to generate the 3D view presented to practitioner 89 by user interface 84. More specifically, 3D data 94 includes information defining the 3D objects that represent each tooth (optionally including roots), and jaw bone within the 3D environment. Rendering engine 88 processes each object to render a 3D triangular mesh based on viewing perspective of practitioner 89 within the 3D environment. User interface 84 displays the rendered 3D triangular mesh to practitioner 89, and allows practitioner 89 to change viewing perspectives and manipulate objects within the 3D environment.

U.S. Pat. No. 8,194,067, titled, "PLANAR GUIDES TO VISUALLY AID ORTHODONTIC APPLIANCE PLACEMENT WITHIN A THREE-DIMENSIONAL (3D) ENVIRONMENT," issued on Jun. 5, 2012, and U.S. Pat. No. 7,731,495, titled, "USER INTERFACE HAVING CROSS SECTION CONTROL TOOL FOR DIGITAL ORTHODONTICS," issued on Jun. 8, 2010, describe other examples for computer systems and 3D modeling software having user interfaces that may be used with the techniques described herein.

Client computing device 80 includes processor 83 and memory 85 in order to store and execute modeling software 82. Memory 85 may represent any volatile or non-volatile storage elements. Examples include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include non-volatile storage, such as a hard-disk, magnetic tape, a magnetic or optical data storage media, a compact disk (CD), a digital versatile disk (DVD), a Blu-ray disk, and a holographic data storage media. Processor 83 represents one or more processors such as a general-purpose microprocessor, a specially designed processor, an application specific integrated circuit (ASIC), a field programmable gate array (FPGA), a collection of discrete logic, or any type of processing device capable of executing the techniques described herein. In one example, memory 85 may store program instructions (e.g., software instructions) that are executed by processor 83 to carry out the techniques described herein. In other examples, the techniques may be executed by specifically programmed circuitry of processor 83. In these or other ways, processor 83 may be configured to execute the techniques described herein.

Client computing device 80 is configured to send a digital representation of a 3D tooth structure of a patient, and optionally, treatment data 92 and/or patient data 96 to computer 70 of manufacturing facility 48 via network 50. Computer 70 includes user interface 72. User interface 72 provides a GUI that visually displays the 3D representation of the digital model of teeth. In addition, user interface 72 provides an interface for receiving input from a user, e.g., via a keyboard and a pointing device, for manipulating a patient's teeth within the digital representation of the 3D tooth structure of the patient.

Computer 70 may further be configured to determine dimensions and shapes of a set of removable dental appliances for the patient, the dimensions and shapes of the removable dental appliance being configured to reposition the one or more teeth of the patient from their initial positions to adjusted positions when the removable dental appliances are worn by the patient. Computer 70 may provide the dimensions and shapes of the set of removable dental appliances for the patient to automated manufacturing system 74 for production of the set of removable dental appliances.

Client computing device 80 and computer 70 are merely conceptual representations of an example computer system. In some examples, the functionalities described with respect to those of client computing device 80 and/or computer 70 may be combined into a single computing device or distributed among multiple computing devices within a computer system. For example, cloud computing may be used for digital design of dental appliances described herein. In one example, the digital representations of tooth structures are received at one computer at the clinic, while a different computer, such as computer 70, is used to determine the shapes and dimensions of a dental appliance. In addition, it may not be necessary for that different computer, such as computer 70, to receive all of the same data in order for it determine shapes and dimensions. Shapes and dimensions may be determined, at least in part, based on knowledge derived through analysis of historical cases or virtual models of exemplary cases, without receiving a complete 3D representation of the case in question. In such an example, data transmitted between client computing device 80 and computer 70, or otherwise utilized to design a custom dental appliance may be significantly less than the complete data set representing a complete digital dental model of a patient.

Figure 14:
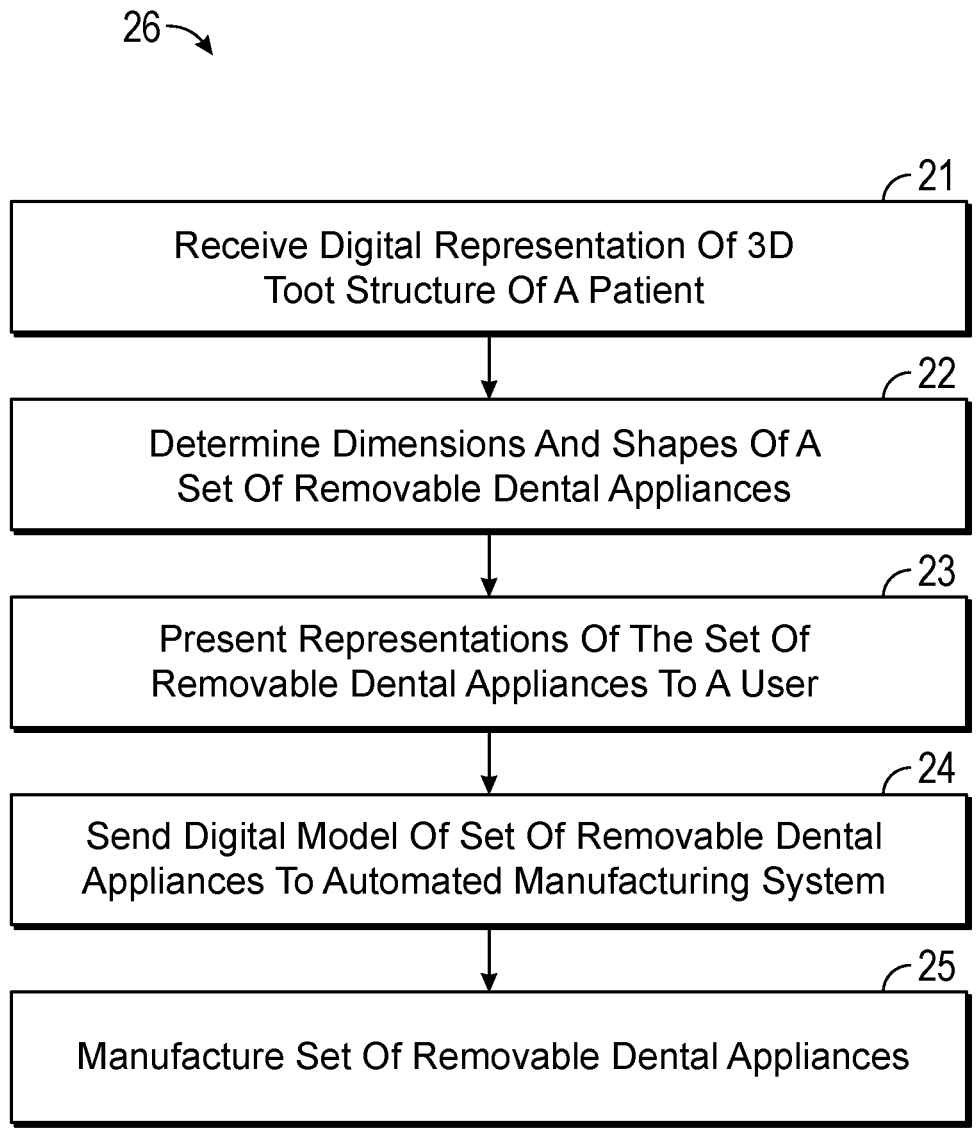
FIG. 14 is a flow diagram illustrating a process conducted at a manufacturing facility for construction of a set of removable dental appliances.

FIG. 14 is a flow diagram illustrating process 26 conducted at manufacturing facility 48 for construction of removable dental appliances 52. In some examples, removable dental appliances 52 may include one or more of removable dental appliances such as those discussed herein. In block 21, a computer 70 at manufacturing facility 48 receives digital tooth structure data 46 from patient 42 via clinic 44, thus providing initial positions of one or more teeth of the patient, and prescription data 47 from clinic 44. Alternatively, computer 70 retrieves the information from a database located within or otherwise accessible by computer 70. A trained user associated with computer 70 may interact with a computerized modeling environment running on computer 70 to develop a treatment plan relative to the digital representation of the patient's tooth structure and generate prescription data 47, if clinic 44 has not already done so. In other examples, computer 70 may automatically develop a treatment plan based solely on the patient's tooth structure and predefined design constraints.

In block 22, the computer 70 determines dimensions and shapes of a removable dental appliance for the patient. The dimensions and shapes of the removable dental appliance are configured to reposition the one or more teeth of the patient from their initial positions to adjusted positions when the removable dental appliance is worn by the patient. In the same or additional examples, computer 70 determines dimensions and shapes of a set of removable dental appliances for the patient, the set of removable dental appliances for the patient being configured to be worn in series.

In some examples, determining dimensions and shapes of the removable dental appliance includes selecting, with computer 70, the dimensions and shapes of the removable dental appliance according to a set of predefined design constraints. The set of predefined design constraints may include one or more factors, including, but not limited to, a maximum localized force applied to one or more of the surrounded teeth, a maximum rotational force applied to one or more of the surrounded teeth, a maximum translational force applied to one or more of the surrounded teeth, a maximum total force applied to one or more of the surrounded teeth, and a maximum strain applied to the removable dental appliance when worn by the patient when the surrounded teeth are in their initial positions.

Computer 70 may use Finite Element Analysis (FEA) techniques to analyze forces on a patient's teeth as well as the removable dental appliance during the determination of the dimensions and shapes of the removable dental appliance. For example, computer 70 may apply FEA to a solid model of the patient's teeth as the modeled teeth move from their initial positions to their final positions, representing a treatment including an ordered set of removable dental appliances. Computer 70 may use FEA techniques to select an appropriate removable dental appliance to apply the desired forces on the teeth. In addition, computer 70 may use a virtual articulator to determine contact points between the teeth throughout the movement of the modeled teeth during the treatment. Computer 70 may further include occlusal contact forces, such as interdigitation forces, in the FEA forces analysis in combination with forces from device during the design of removable dental appliances in an ordered set of removable dental appliances.

In the same or different examples, determining dimensions and shapes of the removable dental appliance includes selecting, with computer 70 thicknesses of the facial portion and the lingual portion of the dental appliance body in order to provide a stiffness suitable to reposition the one or more teeth of the patient from their initial positions to adjusted positions when the removable dental appliance is worn by the patient. In different examples, such selected thickness may range between about 0.25 millimeters and about 2.0 millimeters thick, such as between about 0.5 and about 1.0 millimeters thick. In some examples, computer 70 may further select a material of at least a portion of the removable dental appliance (e.g., the facial and lingual body portions) according to the predefined design constraints or to provide a desired stiffness characteristic without necessarily increasing the thickness.

In block 23, the dimensions and shapes of a removable dental appliance for the patient may be presented to a user via user interface 72 of computer 70. In examples in which dimensions and shapes of the removable dental appliance are presented to a user via user interface 72 of computer 70, the user may have the opportunity to adjust the design constraints or directly adjust the dimensions and shapes of the removable dental appliance before the design data is sent to automated manufacturing system.

In block 23, alternatively or additionally, the dimensions and shapes of a removable dental appliance for the patient may be presented to a user by computer 70 directly as the removable dental appliance manufactured by automated manufacturing system 74. In such examples, computer 70 sends a digital model of the removable dental appliance to automated manufacturing system 74, and automated manufacturing system 74 manufactures the removable dental appliance according to the digital model from computer 70.

In block 24, computer 70, following user approval, sends a digital model of the removable dental appliance to automated manufacturing system 74 (even in examples where the dimensions and shapes of a removable dental appliance for the patient may be presented to a user via user interface 72 of computer 70).

In block 25, an automated manufacturing system 74 manufactures the removable dental appliance according to the digital model from computer 70.

In some examples, automated manufacturing system 74 may include a 3D printer. The techniques of process 26 may be applied to the design and manufacture of each of an ordered set of removable dental appliances for the patient.

For example, each removable dental appliance in the ordered set of removable dental appliances may be configured to incrementally reposition the teeth of the patient. In this manner, the ordered set of removable dental appliances may be configured to reposition the teeth of the patient to a greater degree than any one of the removable dental appliances within the set of the removable dental appliances. Such an ordered set of removable dental appliances for the patient may specifically be configured to incrementally reposition the one or more teeth of the patient from their initial positions to final adjusted positions as the removable dental appliances of the ordered set of removable dental appliances for the patient are worn sequentially by the patient.

In some examples, the techniques described with respect to process 26 may be embodied within a computer-readable storage medium, such as a computer-readable storage medium of client computing device 80 and/or computer 70. The computer-readable storage medium storing computer-executable instructions that, when executed, configure a processor to perform the techniques described with respect to process 26.

Following the design of removable dental appliances 52, manufacturing facility 48 fabricates removable dental appliances 52 in accordance with the digital tooth structure data 46 and prescription data 47. Construction of removable dental appliances 52 may include 3D printing, thermoforming, injection molding, lost wax casting, 5-axis milling, laser cutting, hybrid plastic and metal manufacturing techniques, such as snap-fitting and overmolding, as well as other manufacturing techniques.

Figure 15:
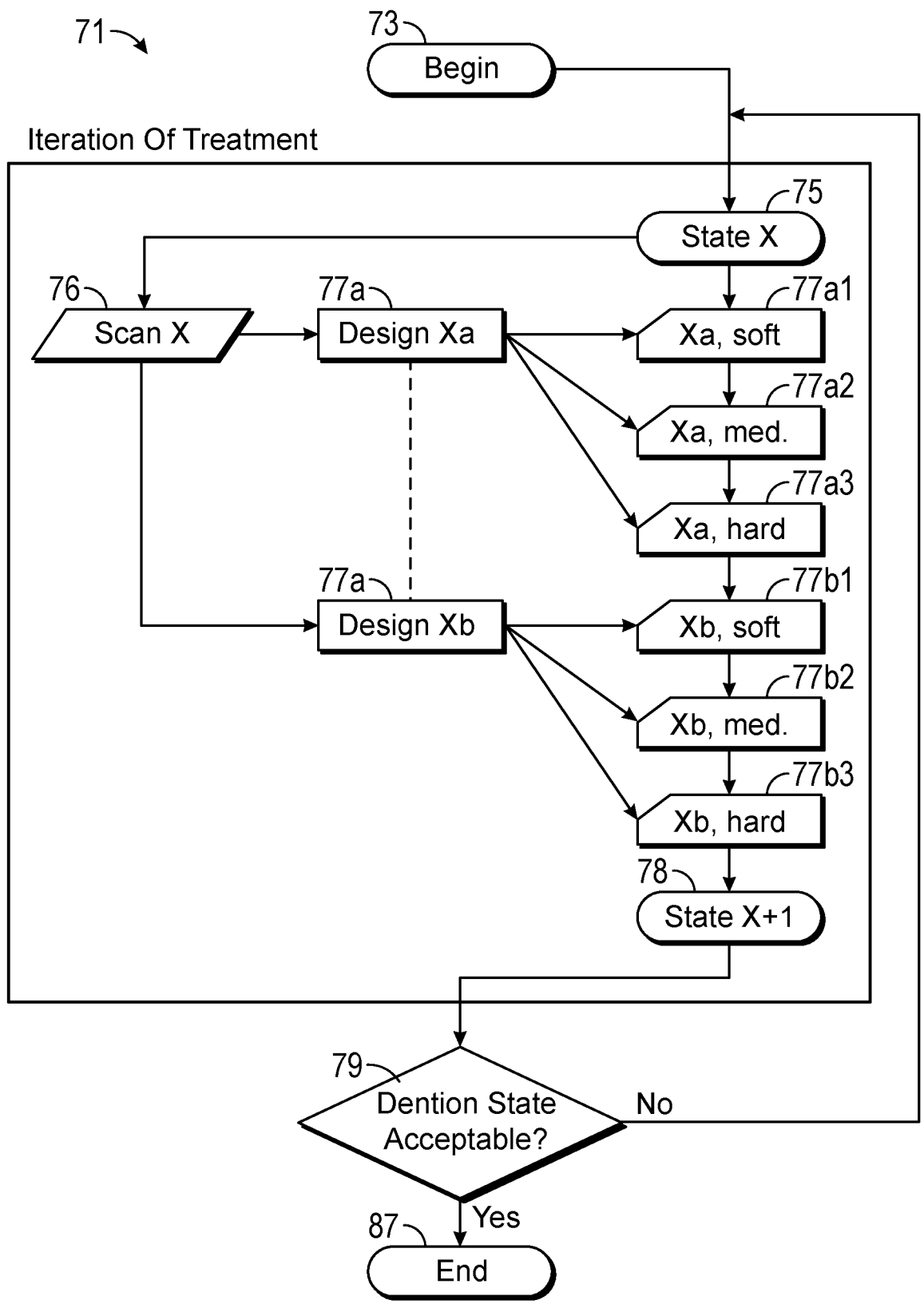
FIG. 15 is a flow diagram illustrating successive iterations of treatment using an ordered set of removable dental appliances.

FIG. 15 is a flow diagram 71 illustrating successive iterations of treatment using an ordered set of removable dental appliances. The ordered set of removable dental appliances is configured to reposition one or more teeth of a patient. In various examples, the ordered set of removable dental appliances may include one or more of removable dental appliances described herein. Accordingly, treatment may feature a plurality of the removable dental appliances described herein and need not be limited to iterations of one particular dental appliance embodiment. In one exemplary implementation, the treatment may initially begin with iterations of one or more removable dental appliance described herein and, once the patient's teeth have moved a certain desired amount, treatment may continue with iterations of removable dental appliance described herein.

In block 73, treatment begins with the first iteration of treatment. At the beginning of the first iteration of treatment, the patient's teeth are at their initial positions as represented by dentition state X in block 75. In block 76, a scan of the patient's teeth are taken to facilitate the design of the ordered set of removable dental appliances. From the scan of patient's teeth, a computer determines two different shapes and dimensions for removable dental appliances in the ordered set: design 77*a* and design 77*b*. Example techniques for creating a digital model of a patient's teeth are described in U.S. Pat. No. 8,738,165 to Cinader et al., titled, "METHODS OF PREPARING A VIRTUAL DENTITION MODEL AND FABRICATING A DENTAL RETAINER THEREFROM," and issued on May 27, 2014. The computer may determine two different shape and dimensions for removable dental appliances in the ordered set by first adjusting the digital model of the patient's teeth to create a model of the desired position of the patient's teeth following the therapy. Then, the computer may create the shape and dimensions for removable dental appliances in the ordered set based on the time and forces required to move the patient's teeth from the initial positions to their desired positions. For example, the computer model may adjust the thicknesses and other dimensions of spring-like elements of the removable dental appliances in the ordered set to produce the forces required to move the patient's teeth from the initial positions to their desired positions.

The modeled forces applied by removable dental appliances in the ordered set may further be based on the incremental positional movements of the patient's teeth during the treatment. In this manner, the computer may design shape and dimensions for each of the removable dental appliances in the ordered set according to expected forces applied on the teeth for the predicted positions during the treatment when the removable dental appliances in the ordered set is to be worn by the patient.

In some examples, more than one, such as three, different removable dental appliances in the set of removable dental appliances can be manufactured using each of the two different shapes and dimensions to produce six removable dental appliances in the set of removable dental appliances. The first through third dental appliances within the ordered set of dental appliances are of the same shape and dimensions, but comprise materials with different stiffness characteristics. The second and third dental appliances have higher stiffness characteristics than the first dental appliance, and the third dental appliance also having higher stiffness characteristics than second dental appliance. Likewise, the fourth through sixth dental appliances within the ordered set of dental appliances are of the same shape and dimensions, but comprise materials with different stiffness characteristics. The fifth and sixth dental appliances having higher stiffness characteristics than fourth dental appliance, and the sixth dental appliance also having higher stiffness characteristics than fifth dental appliance. In some examples, the first dental appliance may have the same stiffness characteristics as the fourth dental appliance.

Likewise, in some examples, the second dental appliance may have the same stiffness characteristics as the fifth dental appliance. Further, in some examples, the third dental appliance may have the same stiffness characteristics as the sixth dental appliance.

In one exemplary treatment methodology, the first removable dental appliance 77*a*1 in the ordered set of removable dental appliances is made from a relatively soft material, such as a relatively soft polymeric material. The first removable dental appliance in the ordered set of removable dental appliances conforms to design 77*a*, and is made from a relatively soft material, such as a relatively soft polymeric material. The second removable dental appliance 77*a*2 in the ordered set of removable dental appliances conforms to design 77*a*, and is made from a material of medium stiffness, such as a relatively stiffer polymeric material than with the first removable dental appliance in the ordered set of removable dental appliances. The third removable dental appliance 77*a*3 in the ordered set of removable dental appliances conforms to design 77*a*, and is made from a material of high stiffness, such as a relatively stiffer polymeric material than with the second removable dental appliance in the ordered set of removable dental appliances. The fourth removable dental appliance 77*b*1 in the ordered set of removable dental appliances conforms to design 77*b*, and is made from a relatively soft material. The fifth removable dental appliance 77*b*2 in the ordered set of removable dental appliances conforms to design 77*b*, and is made from a material of medium stiffness. The sixth removable dental appliance 77b3 in the ordered set of removable dental appliances conforms to design 77b, and is made from a material of high stiffness.

The first through sixth removable dental appliances in the ordered set of removable dental appliances are worn in sequence over time by the patient. For example, each of the removable dental appliances in the ordered set of removable dental appliances may be worn between about 2 weeks and about 12 weeks, such as between about 3 weeks and about 10 weeks or between about 4 weeks and about 8 weeks. Following the treatment plan using the first through sixth removable dental appliances, the patient's teeth are at their final positions for the first iteration of treatment as represented by block 78, which shows the detention state X+1.

In block 79, the patient may return to the clinician who may evaluate the result of the first iteration of treatment. In the event that the first iteration of treatment has resulted in satisfactory final placement of the patient's teeth, the treatment may be ended in block 87. However, if the first iteration of treatment did not complete the desired movement of the patient's teeth, one or more additional iterations of treatment may be performed, and the process can continue to block 73. To begin the next iteration of treatment, the clinician may take another scan of the patient's teeth to facilitate the design of the ordered set of removable dental appliances in block 76. In some examples, evaluation of the result of the first iteration of treatment may include taking another scan of the patient's teeth, in which case beginning the next iteration of treatment may simply involve forwarding the digital model of the patient's teeth to a manufacturing facility so that another ordered set of removable dental appliances may be manufactured for the patient based on the new positions of the patient's teeth. In yet other examples, the newly acquired scan may be used to create one or more iterations of removable dental appliances in the clinician's facility.

The techniques of flow diagram 71 represent one specific example, and a variety of modifications may be made to the techniques of flow diagram 71 within the spirit of this disclosure. For example, an ordered set of removable dental appliances may include more or less than six removable dental appliances. As another example, each removable dental appliance in the ordered set of removable dental appliances may have unique shapes and dimensions.

LIST OF ILLUSTRATIVE EMBODIMENTS

Embodiment 1

An orthodontic bracket comprising:
a bracket body configured to couple to an arch member; and
a first bracket footing disposed adjacent the bracket body, wherein the first bracket footing has at least one major surface.

Embodiment 2

The orthodontic bracket of any of the preceding embodiments, wherein the first bracket footing extends beyond a plane of the bracket body.

Embodiment 3

The orthodontic bracket of any of the preceding embodiments, wherein at least a portion of the at least one major surface is configured to mate with a receptacle formed from a bracket base.

Embodiment 4

The orthodontic bracket of any of the preceding embodiments, wherein the first bracket footing has a sufficient length to at least partially embed into the base.

Embodiment 5

The orthodontic bracket of any of the preceding embodiments, wherein the length of the first bracket footing is at least 0.05 mm.

Embodiment 6

The orthodontic bracket of any of the preceding embodiments, wherein the bracket body has a first cross-sectional area and the first bracket footing has a second cross-sectional area, wherein the second cross-sectional area is no greater than the first cross-sectional area.

Embodiment 7

The orthodontic bracket of any of the preceding embodiments, wherein the bracket body has a first cross-sectional area and the first bracket footing has a second cross-sectional area, wherein the second cross-sectional area is no greater than 75% of the first cross-sectional area.

Embodiment 8

The orthodontic bracket of any of the preceding embodiments, wherein the bracket body has a first cross-sectional area and the first bracket footing has a second cross-sectional area, wherein the second cross-sectional area is no greater than 50% of the first cross-sectional area.

Embodiment 9

The orthodontic bracket of any of the preceding embodiments, wherein the bracket body has a first cross-sectional area and the first bracket footing has a second cross-sectional area, wherein the second cross-sectional area is no greater than 25% of the first cross-sectional area.

Embodiment 10

The orthodontic bracket of any of the preceding embodiments, wherein the bracket body has a first cross-sectional area and the first bracket footing has a second cross-sectional area, wherein the second cross-sectional area is no greater than 15% of the first cross-sectional area.

Embodiment 11

The orthodontic bracket of any of the preceding embodiments, wherein the first bracket footing is coupled to the bracket body.

Embodiment 12

The orthodontic bracket of any of the preceding embodiments, wherein at least a portion of at least two major surfaces is configured to continuously contact the bracket base.

Embodiment 13

The orthodontic bracket of any of the preceding embodiments, wherein the first cross-sectional area is defined by a first plane parallel to a second plane defined by a contact area of the body, wherein the first plane is planar with at least one contact point between the dental surface the bracket body or a bracket base, wherein the first plane and the second plane are perpendicular to a third plane, wherein the third plane is defined by the contact area and a midpoint of the bracket.

Embodiment 14

The orthodontic bracket of any of the preceding embodiments, wherein the second cross-sectional area is defined by a fourth plane parallel to the second plane and the fourth plane is planar with the distal most end of the base.

Embodiment 15

The orthodontic bracket of any of the preceding embodiments, wherein the first bracket footing has a first section and a second section.

Embodiment 16

The orthodontic bracket of any of the preceding embodiments, wherein the first section has a greater length than the second section.

Embodiment 17

The orthodontic bracket of any of the preceding embodiments, wherein the bracket body comprises at least one outer surface.

Embodiment 18

The orthodontic bracket of any of the preceding embodiments, wherein the bracket body comprises at least one inner surface.

Embodiment 19

The orthodontic bracket of any of the preceding embodiments, wherein the bracket body further comprises a contact area for the arch member.

Embodiment 20

The orthodontic bracket of any of the preceding embodiments, wherein the contact area comprises at least a portion of the outer surface.

Embodiment 21

The orthodontic bracket of any of the preceding embodiments, wherein the contact area comprises at least a portion of the inner surface.

Embodiment 22

The orthodontic bracket of any of the preceding embodiments, wherein the bracket body further comprises a slot at adjacent the contact area.

Embodiment 23

The orthodontic bracket of any of the preceding embodiments, wherein the bracket body further comprises a slot within the contact area.

Embodiment 24

The orthodontic bracket of any of the preceding embodiments, wherein the contact area is a sufficient size to secure a 22 mil arch member.

Embodiment 25

The orthodontic bracket of any of the preceding embodiments, wherein the contact area is a sufficient size to secure an 18 mil arch member.

Embodiment 26

The orthodontic bracket of any of the preceding embodiments, further comprising a second bracket footing.

Embodiment 27

The orthodontic bracket of any of the preceding embodiments, wherein the first bracket footing further comprises a barb.

Embodiment 28

The orthodontic bracket of any of the preceding embodiments, wherein the barb is attached to the first bracket footing.

Embodiment 29

The orthodontic bracket of any of the preceding embodiments, wherein the barb is biased at least a 1 degree angle toward the bracket body.

Embodiment 30

The orthodontic bracket of any of the preceding embodiments, wherein the barb is biased no greater than a 90 degree angle toward the bracket body.

Embodiment 31

The orthodontic bracket of any of the preceding embodiments, wherein the barb is flexible.

Embodiment 32

The orthodontic bracket of any of the preceding embodiments, wherein the barb is has a modulus of resilience of at least 0.5 megapascals.

Embodiment 33

The orthodontic bracket of any of the preceding embodiments, wherein the first bracket footing further comprises a rounded distal portion.

Embodiment 34

The orthodontic bracket of any of the preceding embodiments, further comprising a flange.

Embodiment 35

An appliance comprising:
the orthodontic bracket of any of the preceding embodiments; and a bracket base having a receptacle formed therein, wherein the receptacle is configured to mate with the first bracket footing.

Embodiment 36

The appliance of embodiment 35, wherein the bracket base is configured to prevent the first bracket footing from embedding further.

Embodiment 37

The appliance of any of the preceding embodiments, wherein the first bracket footing is coupled to the receptacle of the bracket base.

Embodiment 38

The appliance of any of the preceding embodiments, wherein the bracket base is adjacent to a tooth.

Embodiment 39

The appliance of any of the preceding embodiments, wherein the bracket base contacts the dental surface.

Embodiment 40

The appliance of any of the preceding embodiments, wherein the receptacle has a depth no greater than the length of the first bracket footing.

Embodiment 41

The appliance of any of the preceding embodiments, wherein the depth of the receptacle is defined by at least an outer surface of the bracket base and a surface of the receptacle.

Embodiment 42

The appliance of any of the preceding embodiments, wherein the depth of the receptacle is defined by at least the vestibular-most surface of the bracket base and a surface of the receptacle.

Embodiment 43

The appliance of any of the preceding embodiments, wherein the depth of the receptacle is defined by at least the oral-most surface of the bracket base and a surface of the receptacle.

Embodiment 44

The appliance of any of the preceding embodiments, wherein the depth of the receptacle is at least 5% of a length the first bracket footing.

Embodiment 44a

The appliance of any of the preceding embodiments, further comprising an adhesive disposed on a portion of the bracket base.

Embodiment 45

The appliance of any of the preceding embodiments, wherein the first bracket footing continuously contacts a tooth.

Embodiment 46

The appliance of any of the preceding embodiments, wherein the bracket base is substantially planar to a dental surface.

Embodiment 47

The appliance of any of the preceding embodiments, wherein the bracket base comprises a polymeric substance.

Embodiment 48

The appliance of any of the preceding embodiments, wherein the receptacle has a first portion that is raised relative to a major surface of the bracket base.

Embodiment 49

The appliance of any of the preceding embodiments, wherein the receptacle has a second portion that is depressed relative to the outer surface of the raised portion.

Embodiment 50a

The appliance of any of the preceding embodiments, wherein the receptacle has a third portion that is depressed relative to the second portion.

Embodiment 50b

The appliance of any of the preceding embodiments, wherein the third portion has a major surface that has a plane that is substantially parallel to a plane formed by a major surface of the bracket base.

Embodiment 51

The appliance of any of the preceding embodiments, wherein the third portion defines a path of the first bracket footing.

Embodiment 51a

The appliance of any of the preceding embodiments, wherein the second portion is configured to mate with the flange of the bracket body.

Embodiment 52

The appliance of any of the preceding embodiments, wherein the first portion borders the bracket body.

Embodiment 53

The appliance of any of the preceding embodiments, wherein the bracket base is conformable to a tooth.

Embodiment 54

The appliance of any of the preceding embodiments, wherein the bracket base is a polymeric shell portion having one or more cavities shaped therein to receive one or more teeth.

Embodiment 55

A removable dental appliance comprising:
a plurality of polymeric shell portions each having one or more cavities shaped therein to receive one or more teeth and wherein each of the plurality of shell portions is formed to be separate from the other plurality of shell portions;
the orthodontic bracket of any of the preceding embodiments.

Embodiment 56

The removable dental appliance of any of the preceding embodiments, wherein the orthodontic bracket is attached to the lingual side of the of the polymeric shell portion.

Embodiment 57

The removable dental appliance of any of the preceding embodiments, wherein the orthodontic bracket is attached to the labial side of the polymeric shell portion.

Embodiment 58

The removable dental appliance of any of the preceding embodiments, wherein a first orthodontic bracket is attached to the labial side and a second orthodontic bracket is attached to the lingual side of the polymeric shell portion.

Embodiment 59

The removable dental appliance of any of the preceding embodiments, further comprising an arch member coupled to the first orthodontic bracket and the second orthodontic bracket.

Embodiment 60

The removable dental appliance of any of the preceding embodiments, wherein the arch member is formed from a polymer.

Embodiment 61

The removable dental appliance of any of the preceding embodiments, wherein the arch member has a lower fracture point than yield point.

Embodiment 62

The removable dental appliance of any of the preceding embodiments, wherein the polymeric arch member comprises polyurethane resin.

Embodiment 63

The removable dental appliance of any of the preceding embodiments, wherein the polymeric arch member comprises methacrylate resin.

Embodiment 64

The removable dental appliance of any of the preceding embodiments, wherein a first shell portion and a second shell portion of the at least one shell portions are designed to provide one or more forces to reposition one or more teeth received within one or more cavities formed in the first or second shell portions from a first orientation to a successive orientation and wherein the arch member transfers force between the first shell portion and the second shell portion to reposition the one or more teeth.

Embodiment 65

The removable dental appliance of any of the preceding embodiments, wherein the first shell portion and the second shell portion are coupled to each other.

Embodiment 66

The removable dental appliance of any of the preceding embodiments, wherein the first shell portion and the second shell portion are coupled to each other through the arch member and the orthodontic bracket.

Embodiment 67

The removable dental appliance of any of the preceding embodiments, wherein the arch member has one or more bends in the relaxed state.

Embodiment 68

The removable dental appliance of any of the preceding embodiments, wherein the arch member comprises a wire.

Embodiment 69

The removable dental appliance of any of the preceding embodiments, wherein the first shell portion has a void formed therein that fits a tooth.

Embodiment 70

The removable dental appliance of any of the preceding embodiments, wherein the cut-out exposes at least 50% of the surface area of the tooth.

Embodiment 71

A method of making an appliance comprising: disposing the bracket base of any of the preceding embodiments on a tooth; coupling the bracket of any of the preceding embodiments onto the bracket base via the first bracket footing.

Embodiment 72

The method of embodiment 71, further comprising: forming the bracket base according to dimensions of the tooth.

Embodiment 73

A method of modifying a dental structure of a patient comprising:
receiving a digital representation of a dental structure of a patient;
determining dimensions and shapes of a removable dental appliance based on forces required to modify the dental structure from an initial position to an adjusted position when the removable dental appliance is worn by the patient; and
forming the removable dental appliance of any of the preceding embodiments.

Embodiment 74

The method of any of the preceding embodiments, further comprising forming the orthodontic bracket of any of the preceding embodiments with the removable dental appliance in a location sufficient to modify the dental structure.

Embodiment 75

The method of any of the preceding embodiments, further comprising attaching the orthodontic bracket to a shell portion of the removable dental appliance in a location sufficient to modify the dental structure.

Embodiment 76

The method of any of the preceding embodiments, further comprising forming the arch member of any of the preceding embodiments.

Embodiment 77

The method of any of the preceding embodiments, further comprising: attaching the arch member to the orthodontic bracket.

Embodiment 78

The method of any of the preceding embodiments, wherein forming the removable dental appliance comprises:
   forming, from a first polymeric material, a plurality of shell portions each having at least one cavity shaped to receive one or more teeth of a user;
   forming, from a second polymeric material, the orthodontic bracket of any of the preceding embodiments; and
   forming, from a third polymeric material, an arch member,
   wherein the removable dental appliance is formed as a single piece.

Embodiment 79

The method of any of the preceding embodiments, wherein forming the removable dental appliance comprises printing the removable dental appliance of any of the preceding embodiments at substantially the same time.

Embodiment 80a

The method of any of the preceding embodiments, wherein the forming the plurality of shell portions is performed by:
   a) providing a printable composition comprising a high viscosity polymerizable component, a temporary solvent, and an initiator;
   b) selectively curing the printable composition to form an article representing the shape of the three-dimensional object;
   c) removing a substantial amount of the temporary solvent from the article; and
   optionally curing unpolymerized polymerizable component remaining before or after step c.

Embodiment 80b

The method of any of the preceding embodiments, wherein the forming the plurality of shell portions is performed by:
   depositing a first layer of the printable composition such that the first layer corresponds to a first portion of the plurality of shell portions;
   depositing a second layer of the printable composition such that the second layer corresponds to a second portion of the plurality of shell portions; wherein the first and second layers are adjacent.

Embodiment 81

The method of any of the preceding embodiments, wherein forming the removable dental appliance further comprises
   attaching the orthodontic bracket of any of the preceding embodiments to at least one of the shell portions sufficient to perform the modification.

Embodiment 82

The method of any of the preceding embodiments, wherein forming the removable dental appliance further comprises
   bending the arch member sufficient to perform the modification, and
   attaching the arch member to the orthodontic bracket.

Embodiment 83

The method of any of the preceding embodiments, further comprising attaching the removable dental appliance to the dental structure.

Embodiment 84

The method of any of the preceding embodiments, further comprising removing a portion of at least one of the shell portions.

Embodiment 85

The method of any of the preceding embodiments, wherein removing a portion of the shell portion allows the bracket to remain on at least one of the teeth.

Embodiment 86

A method of securing an arch member, comprising
   attaching the bracket base of any of the preceding embodiments to a tooth.

Embodiment 87

The method of any of the preceding embodiments, wherein the attaching further comprises
   applying adhesive to the bracket base;
   applying a force to the bracket base toward the tooth.

Embodiment 88

The method of any of the preceding embodiments, wherein the attaching further comprises
   drilling into the tooth at a depth of the first bracket footing.

Embodiment 89

An orthodontic kit, comprising
   the orthodontic bracket of any of the proceeding embodiments; and
   the bracket base of any of the proceeding embodiments.

Embodiment 90

The orthodontic kit of embodiment 89, further comprising an arch member.

What is claimed is:

1. An appliance comprising:
a polymeric shell portion having one or more cavities shaped therein to receive one or more teeth, the polymeric shell portion including a receptacle formed therein and acting as a base for coupling to an orthodontic bracket,
the orthodontic bracket comprising:
a bracket body configured to couple to an arch member, the bracket body comprising an interior channel for receiving the arch member, the channel including a facial-lingual wall and an opening opposite facial-lingual wall, the opening extending a longitudinal axis of the channel;
a first bracket footing projecting from the bracket body, wherein the first bracket footing has at least one major surface that is configured to mate with the a-receptacle, wherein the mating of the base to the bracket body closes the opening such that the arch member, once coupled, is disposed between the base and the facial-lingual wall.

2. The appliance of claim 1, wherein the first bracket footing is configured to at least partially embed into the base.

3. The appliance of claim 2, wherein the length of the first bracket footing is at least 0.05 mm.

4. The appliance of claim 1, wherein the bracket body further comprises a contact area for the arch member.

5. The appliance of claim 4, wherein the contact area comprises at least a portion of the facial-lingual wall.

6. The appliance of claim 5, wherein the inner surface includes at least one securement protrusion entering the channel, the securement protrusion contacting the arch member when the arch member coupled to the bracket body.

7. The appliance of claim 1, further comprising a second bracket footing.

8. The appliance of claim 1, wherein the receptacle has a first portion that is raised relative to a major surface of the bracket base, wherein the first portion borders the bracket body.

9. The appliance of claim 8, wherein the bracket body includes a flange, wherein the receptacle has a second portion that is depressed relative to an outer surface of the raised portion, and wherein the second portion is configured to mate with the flange.

10. The appliance of claim 9, wherein the receptacle has a depth no greater than a length of the first bracket footing.

11. The appliance of claim 1, wherein the first bracket footing comprises a barb.

12. The appliance of claim 1, wherein the receptacle and footing are configured to fix a location of the bracket body relative to the base.

13. The appliance of claim 1, further comprising the arch member coupled to the orthodontic bracket.

14. A removable dental appliance comprising:
a plurality of polymeric shell portions each having one or more cavities shaped therein to receive one or more teeth and wherein each of the plurality of shell portions is formed to be separate from the other plurality of shell portions, wherein at least one shell portion of the plurality of polymeric shell portions includes a receptacle formed therein; and
an orthodontic bracket comprising:
a bracket body configured to couple to an arch member, the bracket body comprising an interior channel for receiving the arch member, the channel including a facial-lingual wall and an opening opposite facial-lingual wall, the opening extending a longitudinal axis of the channel;
a first bracket footing projecting from the bracket body, wherein the first bracket footing has at least one major surface that is configured to mate with the receptacle, wherein the mating of the base to the bracket body closes the opening such that the arch member, once coupled, is disposed between the shell portion and the facial-lingual wall, and
wherein the first bracket footing extends beyond a plane formed by a major surface of the bracket body.

* * * * *

UNITED STATES PATENT AND TRADEMARK OFFICE
CERTIFICATE OF CORRECTION

PATENT NO. : 11,351,012 B2
APPLICATION NO. : 16/469564
DATED : June 7, 2022
INVENTOR(S) : Richard Edward Raby Page 1 of 1

It is certified that error appears in the above-identified patent and that said Letters Patent is hereby corrected as shown below:

In the Claims

<u>Column 35</u>
Line 17, In Claim 1, delete "a-receptacle" and insert -- receptacle --, therefor.

Signed and Sealed this
Third Day of January, 2023

*Katherine Kelly Vidal*

Katherine Kelly Vidal
*Director of the United States Patent and Trademark Office*